US005819171A

United States Patent [19]
Hoogerwerf et al.

[11] Patent Number: 5,819,171
[45] Date of Patent: Oct. 6, 1998

[54] AUTOMATED FORCED CALL DISRUPTION FOR USE WITH WIRELESS TELEPHONE SYSTEMS

[75] Inventors: David N. Hoogerwerf, Everett; David M. Stanhope, Tacoma; William Gerrit Barrere, Kirkland; Evan R. Green, Bothell, all of Wash.; Randolph W. McKernan, Grafton, Calif.

[73] Assignee: Cellular Technical Services Co., Inc., Seattle, Wash.

[21] Appl. No.: 521,797

[22] Filed: Aug. 31, 1995

[51] Int. Cl.⁶ .................................................. H04M 11/00
[52] U.S. Cl. ........................................... 455/410; 455/411
[58] Field of Search ................................. 379/59, 63, 58; 455/33.1, 54.1, 410, 411, 436, 507, 88

[56] References Cited

U.S. PATENT DOCUMENTS

| | | | |
|---|---|---|---|
| 4,843,562 | 6/1989 | Kenyon et al. | 364/487 |
| 4,955,049 | 9/1990 | Ghisler | 455/410 |
| 4,984,290 | 1/1991 | Levine et al. | 455/436 |
| 5,005,210 | 4/1991 | Ferrell | 455/115 |
| 5,091,942 | 2/1992 | Dent | 380/46 |
| 5,222,140 | 6/1993 | Beller et al. | 380/30 |
| 5,237,612 | 8/1993 | Raith | 380/23 |
| 5,239,294 | 8/1993 | Flanders et al. | 340/825.34 |
| 5,241,598 | 8/1993 | Raith | 380/21 |
| 5,282,250 | 1/1994 | Dent et al. | 380/23 |
| 5,299,263 | 3/1994 | Beller et al. | 380/30 |
| 5,303,285 | 4/1994 | Kerihuel et al. | 455/461 |
| 5,309,501 | 5/1994 | Kozik et al. | 455/410 |
| 5,319,699 | 6/1994 | Kerihuel et al. | 455/461 |
| 5,329,591 | 7/1994 | Magrill | 380/25 |
| 5,335,265 | 8/1994 | Cooper et al. | 455/410 |
| 5,335,278 | 8/1994 | Matchett et al. | 380/23 |
| 5,345,595 | 9/1994 | Johnson et al. | 455/410 |
| 5,390,245 | 2/1995 | Dent et al. | 380/23 |
| 5,392,356 | 2/1995 | Konno et al. | 380/23 |
| 5,396,653 | 3/1995 | Kivari et al. | 455/88 |
| 5,420,908 | 5/1995 | Hodges et al. | 455/411 |
| 5,420,910 | 5/1995 | Rudokas et al. | 455/410 |
| 5,455,863 | 10/1995 | Brown et al. | 380/23 |
| 5,465,387 | 11/1995 | Mukherjee | 455/26.1 |
| 5,467,382 | 11/1995 | Schorman | 455/410 |
| 5,488,649 | 1/1996 | Schellinger | 455/411 |
| 5,509,075 | 4/1996 | Grube et al. | 380/23 |
| 5,517,554 | 5/1996 | Mitchell et al. | 455/411 |
| 5,517,555 | 5/1996 | Amadon et al. | 455/408 |
| 5,517,568 | 5/1996 | Grube et al. | 380/23 |
| 5,535,429 | 7/1996 | Bergenlid et al. | 455/507 |
| 5,537,474 | 7/1996 | Brown et al. | 455/411 |
| 5,541,977 | 7/1996 | Hodges et al. | 455/411 |
| 5,551,073 | 8/1996 | Sammarco | 455/411 |
| 5,555,551 | 9/1996 | Rudokas et al. | 455/410 |

FOREIGN PATENT DOCUMENTS

| | | | |
|---|---|---|---|
| 0 629 093 A1 | 12/1994 | European Pat. Off. | H04Q 7/04 |
| 305108 | 3/1989 | Japan . | |

*Primary Examiner*—William Cumming
*Assistant Examiner*—Myron K. Wyche
*Attorney, Agent, or Firm*—Seed and Berry LLP

[57] ABSTRACT

A method and apparatus which provide the ability to disrupt normal completion of a specific call made through a wireless telephone system. The specified call can be forced to be immediately ended, re-routed immediately to a selectable destination, or linked to a local voice frequency interface. The disruption of the call can occur at any point in time over the duration of the call. The decision to disrupt the call, as well as which action to take against the call, can be selected manually by a human or automatically through a standard data interface provided. The call disruption apparatus can be interfaced to the wireless system through a circuit physically connected to the wireless telephone system equipment, or through a modulated radio frequency interface.

33 Claims, 10 Drawing Sheets

| FREQ | SAT | SW | CELL | SCTR | MODULE-ID | STAT | NFRQ | NSAT | MOBILE-ID |
|---|---|---|---|---|---|---|---|---|---|
| 012 | 1 | AN | 146 | A | LAAN146A01 | IDLE | | | |
| 033 | 1 | AN | 146 | A | LAAN146A02 | ICMP | | | 1017450012 |
| 054 | 1 | AN | 146 | A | LAAN146A03 | CALL | | | 1117275555 |
| 221 | 0 | AN | 470 | A | LAAN470A01 | CALL | | | 0105551212 |
| 242 | 0 | AN | 470 | A | LAAN470A02 | IDLE | | | |
| 019 | 2 | MD | 261 | A | LAMD261A01 | IDLE | | | |
| 205 | 1 | MD | 261 | B | LAMD261B01 | H-O | 112 | 0 | 7075551212 |
| 226 | 1 | MD | 261 | B | LAMD261B02 | INTR | | | 1014333036 |
| 112 | 0 | MD | 377 | A | LAMD377A01 | H-I | | | 7075551212 |

*Fig. 2*

AUTOMATED FORCED CALL DISRUPTION FOR USE WITH WIRELESS TELEPHONE SYSTEMS

TECHNICAL FIELD

This invention relates generally to the control of a wireless telephone system. More particularly the invention relates to a technique for disrupting or rerouting a wireless telephone call.

BACKGROUND OF THE INVENTION

In certain circumstances the operators of cellular systems need to force the re-routing or termination of a cellular call which is already in progress. This need often arises when the call has been determined to have been established using unauthorized or fraudulent access to a cellular system.

When a cellular telephone call is originated (either making or receiving the call), the origination takes place on a full duplex radio control channel. This control channel relays identification information from the mobile unit to a cell site through a 10 KHz manchester encoded data message on a reverse control channel (RECC) frequency. This mobile identification data (along with other received mobile data) is used to validate that the mobile unit is authorized access to the cellular system. Upon validation of the mobile unit, the cell site control channel sends a 10 KHz Manchester encoded data message to the mobile unit on the forward control channel frequency (FOCC), assigning the call to a full duplex voice channel. This process is referred to as a call set up. The mobile unit retunes to the assigned voice channel and enables the conversation portion of the call to begin.

While tuned to a voice channel the mobile unit constantly receives a specific audio frequency signal modulated onto the forward voice channel frequency (FOVC) from the transmitter at the cell site. This signal (referred to as Signaling Audio Tone, or SAT) is one of three frequencies (5970 Hz, 6000 Hz, or 6030 Hz). These frequencies are outside the normal voice frequency band of cellular (300 Hz–3000 Hz), so during normal conversation on the voice channel neither the user of the cellular telephone nor the other party is able to hear these signals due to filtering in the audio circuits of the cellular phones and the cellular system. The received SAT frequency is continually transponded to the cell site by the mobile modulating this same SAT onto the reverse voice channel frequency (REVC). If the mobile unit is instructed by the cellular system to change to a new voice channel at another cell site (referred to as a hand-off), the mobile retunes to the new voice channel and begins receiving the new SAT transmitted on the new voice channel, transponding the new SAT.

The purpose of the SAT is twofold. First, it is used to help prevent co-channel interference problems. Typically, the frequency plan of a cellular system is designed to keep co-channel radios as far apart as practical. However, it is usually impractical to entirely prevent co-channel interference. Therefor, assigning a different SAT to channels which are co-channel, yet near enough to each other to have possible interference, helps to minimize the effects of the interference. On a cellular voice channel, when a signal is received which does not contain the correct SAT, the received audio is muted to prevent the user from hearing a conversation not intended for them. This also applies to data or other signals being received. In other words, if a cell site receives a disconnect tone (1.8 second burst of 10 KHz) from a mobile which is sending the wrong SAT, the cell site ignores the disconnect signal and assumes that the disconnect tone was unintentionally received as co-channel interference.

The second purpose of the SAT is for determination of the presence of RF continuity on a voice channel. If the cellular mobile receiver does not see the correct SAT for more than a specified amount of time on the FOVC, the cellular mobile unit releases the call. Additionally, the cell site voice channel radio detects the presence of the proper mobile unit by determining that the correct SAT is present on the REVC along with some minimum received RF signal strength.

The normal manner in which the cellular telephone ends a call is by sending a burst of 10 KHz audio, which is known as a signaling tone, or ST to the cell site on the REVC for 1.8 seconds. This burst of ST must be accompanied by the correct SAT or it will be ignored by the cell site voice channel. When the cell site voice channel receives the 10 KHz burst, it times the burst to determine its duration (ST is sent for various other durations, for example, it is also used to signal hook flashes and other conditions). The cell site voice channel also checks to see that the proper SAT is present during the ST burst. If the ST burst is determined to be 1.8 seconds in duration while the correct SAT is present, the cell site voice channel transmitter is turned off, and the call is released (the cellular switch ends connection with the other party).

The cell site voice channel is also capable of forcing the mobile unit to end a call in progress by sending a call termination command to the mobile unit (on the FOVC) in the form of a Manchester encoded 10 KHz data message. It is important to note that when a 10 KHz data message is sent either by the mobile unit (on the REVC) or the cell site voice channel (on the FOVC), the SAT is temporarily turned off for the duration of the message (usually less than 100 ms).

A hand-off in the cellular system is accomplished by the cell site voice channel transceiver sending a command (10 KHz data message) to the mobile unit on the FOVC instructing the mobile to tune to another voice channel. The hand-off is normally used to transfer the mobile unit to a channel serviced by another cell site in order to provide the best RF connection based on the geographic location of the mobile unit. For example, the cell site regularly checks the received signal strength (RSSI) of the mobile's transmitted signal (on the REVC), watching for the RSSI to fall below a certain threshold. If this as well as certain other conditions are met, the cell site starts the process of setting up a hand-off for the mobile unit. If another cell site indicates that it is receiving the mobile unit's signal better than the serving cell site, a hand-off is set up to transfer the mobile unit to a voice channel at the new cell site.

Confirmation of a successful hand-off is accomplished as follows: First, upon receipt of the hand-off command on the FOVC, the mobile unit responds on the REVC with a 50 ms burst of ST (along with proper SAT) confirming receipt of the message. The mobile unit then turns off its transmitter, tunes to the new voice channel, turns its transmitter back on, and begins transponding the new SAT on the new REVC. The new cell site voice channel detects the RF signal and the proper SAT, and thereby confirms that the mobile unit has switched to that channel. A data communication is sent to the cellular switch informing the switch of the successful hand-off. The cellular switch then commands the old voice channel to turn off its transmitter and wait for another call to arrive.

Cellular protocol allows a feature known as conference calling. This feature involves connecting two simultaneous conversations to a mobile party. This is accomplished by causing the cellular switch to receive certain signals from the mobile unit. When a mobile unit has a call in progress to an original party, the mobile party can dial a new phone number of a new party on the cellular phone's keypad, then press the send key. This causes the phone to send a 500 ms burst of ST (hook flash) on the REVC. The cell site voice channel then responds by sending a 10 KHz data message to the mobile unit on the FOVC, requesting the mobile to send the new dialed digits to the cell site. At this point, the cellular switch puts the originally connected party on hold, muting their audio. The mobile then sends a 10 KHz data message on the REVC containing the dialed digits. The cellular switch receives these dialed digits from the mobile unit and attempts to connect the mobile party to the new party. At this point, if the mobile party presses the send key again (sending a 500 ms ST burst on the REVC), the original party is included in a three way conversation with the mobile party and the new party. Various actions can be taken at this point (depending on the cellular switch vendor) which affect the connections of the parties.

Also provided for by cellular protocol is the well known call waiting feature. This feature is used to allow a mobile unit user to receive a second call while a first call is already in progress. If a call is received by the cellular switch for a mobile unit, which is already involved with a call in progress, then the cell site voice channel transceiver sends (on the FOVC) a notification beep to the mobile unit. The mobile unit user can answer the second incoming call by pressing the send key on their cellular telephone (sending a 500 ms ST burst on the REVC). When this ST burst is detected by the cell site voice channel receiver, the cell site equipment sends a data message to the cellular switch which in turn puts the originally connected party on hold and connects the new party to the mobile unit user. Note that since the switching center is where the connection change takes place, the mobile unit is able to continue the connection with the new party using the same radio voice channel it was on when the new call arrived. The cellular mobile unit user can toggle between the two calls by pressing the send key on their phone (sending a 500 ms burst of ST on the REVC).

There are utilities available in prior cellular switching control systems that allow a system operator to force the termination of a call from the switch's control terminal. However, in order for a system operator to accomplish terminating a call in these control systems, he must access the control terminal, log on to the system, then input the required commands to release the call. This process assumes that the system operator knows which cellular telephone or which cellular system channel is being used for the call. The process of identifying this information is time consuming, requiring several manual steps (i.e. performing a call trace, accessing the in-use channel list, coordinating with customer service personnel, etc.). Unfortunately, one of the side effects of using the switch to force a call to end is that the switch has limited processing resources. When the switch resources are busy, commands entered via a control terminal are queued up behind higher priority tasks for execution. In some cases several minutes may pass before the command is executed. So, even if this process is automated, the delays inherent in the switch processing of the commands could allow a call to continue for an extended period of time.

Currently, there are no processes provided by cellular infrastructure vendors for allowing a cellular system operator to re-route a call in progress once a connection to a called party is established.

From this explanation it can be seen that a technique is needed for providing immediate release of a specified call in a cellular system without utilizing additional switch processing resources. There is also a need for a technique that re-routes (connecting to an alternate destination) cellular calls which are already in progress.

SUMMARY OF THE INVENTION

Accordingly, it is an object of this invention to provide an article and method for monitoring and keeping track of voice channel assignments of calls that connected through a cellular telephone system.

It is a further object of this invention to provide an article and method for forcing the immediate termination of a specified cellular telephone call without the need to utilize cellular switching equipment.

It is an additional object of this invention to provide a technique for re-routing a cellular call which is already in progress.

It is a further object of this invention to provide a technique for linking a cellular call which is already in progress to a local voice frequency interface.

It is yet another object of this invention to provide a method for determining whether a hand-off has occurred during the specified call prior to disruption, then gathering the hand-off information (new voice channel frequency and new SAT) for pursuing the disruption of the call on the new voice channel.

It is a further object of this invention to provide a method for preventing a hand-off of the specified cellular call during the process of disrupting the call.

It is an additional object of the invention to provide an automated interface to the call disruption system which allows a requesting entity to specify a call which should be ended, re-routed, or linked to a local voice frequency interface as well as allowing the requesting entity to specify which of these actions should be applied to the specified call.

It is a further object of this invention to provide a method of verifying that the specified interruption of the specified call has successfully taken place.

In accordance with one aspect, the present invention relates to a cellular telephone call interruption module. The module includes a timing source having an externally triggered output, a signal generator circuit that generates an output of a call termination signal for a predetermined period of time upon receipt of the output from the timing source. The module also comprises an individual land based transceiver including supervisory tone detection circuits having an input in communication with the output of the signal generating circuit where the supervisory tone detection circuits regard the call termination signal of the signal generating circuit for the predetermined period as a mobile signal to end a call in progress on the individual land based radio station.

BRIEF DESCRIPTION OF THE DRAWINGS

FIG. 2 is an example table of the call mapping system used to track the location of each call according to the preferred embodiment of the present invention.

DETAILED DESCRIPTION OF THE INVENTION

Figure 1:
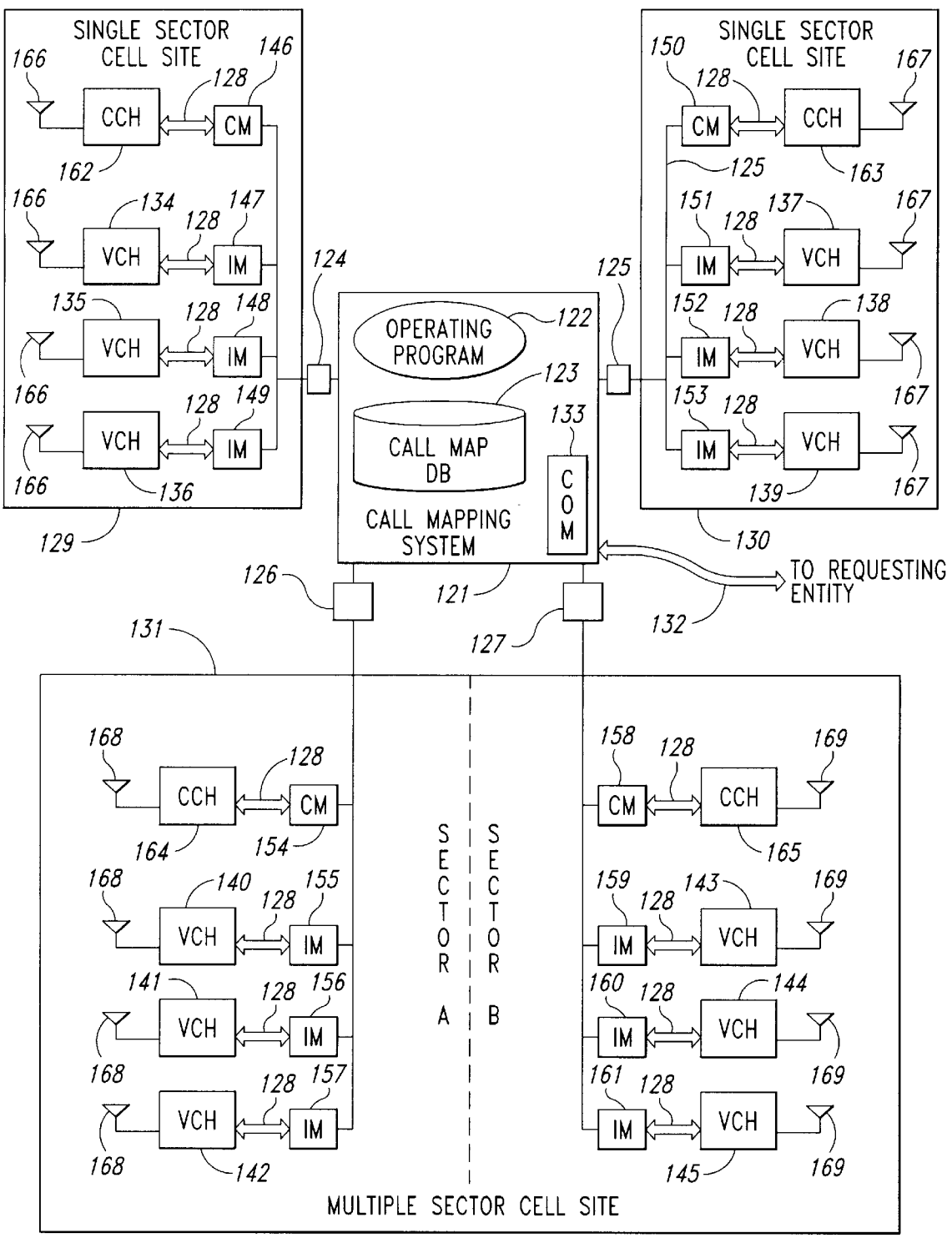
FIG. 1 is an overall block diagram of a preferred embodiment of the present invention.

The cellular call disruption system of the present invention keeps track of voice channel assignments of calls connected through a cellular telephone system by using a network of control channel and voice channel monitoring equipment. The call disruption system receives a command message from a requesting entity specifying a mobile telephone number (MIN) that identifies the call to be interrupted, as well as specifying whether the interruption is to be a termination of the call, a re-routing of the call to a specified destination, or a linking of the call to a local voice frequency interface. The call disruption system then proceeds to send the message to the disruption equipment at the appropriate location, based on the current voice channel assignment of the specified call. The call disruption equipment at the appropriate location performs the requested action on the correct voice channel based on the information contained in the command message. There are many possible embodiments of this call disruption system.

The cellular call disruption system can interface to the cellular system in one of two configurations. In one interface configuration, an RF link to the cell site and mobile can be established either through a physical connection at the cell site or over the air. A second interface configuration utilizes a physical interface to various electrical points on the cell site radio transceivers. Each of these interfaces has advantages and disadvantages which will be discussed. The use of one configuration instead of the other may depend on economic considerations as well as which of the disruption techniques are required for a given installation.

Note that the RF cell site interface configuration for the call disruption system would not easily allow the use of any of the interruption techniques described below which involve either modifying the signals sent on the FOVC to the mobile unit or sending any messages to the mobile unit over the FOVC. This is because the call disruption system transmitter cannot normally transmit on the FOVC. However, an additional transmitter could be used (tuned to the FOVC) for this purpose. This new transmitter would, however, have to overcome the signal being sent by the cell site's voice channel transmitter (this can be as high as 500 Watts effective radiated power). However the RF interface configuration has the advantage of not requiring physical interface to the cell site equipment. This eliminates many of the engineering considerations related to the physical interface to various vendor equipment configurations.

The physical electrical interface configuration has the advantage of more easily controlling most aspects of call activities. However, this configuration requires engineering different interfaces to various makes and models of cell site equipment.

Where an RF interface is used, the call disruption system tunes a local radio frequency transceiver to the voice channel on which the call in progress (to be disrupted) is operating. This local transceiver begins transmitting to the cell site voice channel receiver on the REVC as well as monitoring (receiving) the transmission of the cell site voice channel transmitter on the FOVC. Due to its proximity to the operative cell site (usually located within the cell site itself), the signal strength of the transmission from the local call interruption system's transmitter will "capture" the discriminator of the assigned voice channel receiver at the cell site, overriding any signals sent by the mobile unit operating on the same channel. Any messages or signals sent to the mobile on the FOVC will also be received by the local call disruption equipment's receiver. Note that by using appropriate radio transmission lines, the local transceiver can be physically connected to the cell site equipment's transmit and receive antenna lines (in parallel with the operating antennas).

Alternately, the physical electrical interface requires making connections to the discriminator output (audio and data) and modulator input (audio and data) of the cell site voice channel transceiver. Circuits are attached to these connections which allow encoding and decoding of 10 KHz Manchester encoded data messages as well as detecting and generating 10 KHz (ST) signals and 5970 Hz, 6000 Hz, and 6030 Hz (SAT) signals. This interface allows the attached circuitry to send and receive messages and signaling frequencies to and from both the cell site and the mobile unit. Emulation of cell site and mobile activities are then used to control the actions of both. Monitoring and controlling the received signal strength indicators (RSSI) and PA power output level of the transceiver, this interface allows even more control over the call. Using signal analysis of the signals received from interfacing with the radio voice channel the presence of a particular mobile operating on the voice channel may be detected by methods well-known in the art. It can also be determined, if the mobile leaves the voice channel, whether the mobile left due to a hand-off, a call termination, or a "dropped call". Additionally, these circuits are capable of introducing voice frequency signals (recorded messages, tones, live voice conversation, etc.), as well as carrying the normal conversation from the radio voice channel to other circuits (i.e. recording equipment).

Either of the interface options described above can accomplish the described actions of the present invention.

The present invention is capable of ending a call in progress. Initially, the cellular call disruption system sends to the cell site voice channel receiver (through the REVC path) a 1.8 second burst of 10 KHz ST along with the appropriate SAT. The voice channel receiver's signal detection circuits, upon receipt of this 10 KHz disconnect signal, cause an immediate termination of the call. The call disruption system will detect the disappearance of SAT tone being sent by the cell site voice channel transmitter on the FOVC, verifying that the call has been ended.

An alternate method for accomplishing the termination of a call is for the call disruption circuits to send the mobile receiver (on the FOVC) a specified duration burst of the incorrect SAT (through modulation of the transmitted radio frequency). The mobile receiver, upon receipt of this incorrect SAT signal for more than a specified duration (typically 5 seconds), causes an immediate termination of the call. The duration of incorrect SAT transmission required to end the call is determined by parameters specified in the cellular mobile radio. According to cellular specifications (EIA/TIA 533, incorporated by reference herein), this duration is 5 seconds, though in some mobile units the incorrect SAT will not cause call termination at all due to individual manufacturer variations from the specifications. Another method of accomplishing this effect is by simply distorting the SAT sufficiently on the FOVC.

Another alternate method for accomplishing the termination of the call is for the call disruption circuits to send the cell site receiver (on the REVC) a specified duration burst of the incorrect SAT (through insertion of a signal at the output of the discriminator). The cell site receiver, upon receipt of this incorrect SAT signal for more than a specified duration (typically 5 seconds), causes an immediate termination of the call. The duration of incorrect SAT transmission required to end the call is determined by parameters specified in the cellular system. According to cellular specifications (EIA/TIA 533), this duration is 5 seconds. Alternatively, a method of accomplishing this effect is by simply short circuiting the output of the discriminator, effectively preventing the tone detection circuits of the cell site receiver from detecting the SAT sent by the mobile unit.

Yet another method for accomplishing the termination of the call is for the call disruption circuits to send the mobile receiver (on the FOVC) a 10 KHz manchester encoded data message (through modulation of the transmitted radio frequency) which instructs the mobile to end the call. The mobile unit, upon receipt of this message, performs an immediate termination of the call.

Another method for accomplishing the termination of the call is for the call disruption circuits to send the mobile receiver (on the FOVC) a 10 KHz manchester encoded data message (through modulation of the transmitted radio frequency) which instructs the mobile unit to hand-off to a voice channel which is not in operation within the radio range of the mobile unit. The REVC path must be interrupted at this time to prevent the cell site voice channel from properly receiving ST or SAT from the mobile unit. This interruption can be caused by either filtering out the audio frequencies through the connection at the discriminator or, in the case of an RF interface, by sending an interfering signal on the REVC to mask the mobile's signals. The mobile unit, upon receipt of this hand-off message, will send a 50 ms burst of ST confirming receipt of the data message (which will not be seen by the cell site voice channel due to the interruption described above), then re-tune to the newly assigned voice channel. Some mobile units, upon arriving on the new voice channel and not seeing SAT or RF signal there, will re-tune back to the old voice channel and attempt to re-establish the conversation. In order to prevent this, the FOVC SAT is distorted and the REVC path remains interrupted by the interruption circuits for some period of time after the hand-off message has been sent to the mobile unit.

An additional method of insuring that the cell site radio voice channel considers that the mobile unit has abandoned the call is to electronically modify the RSSI signals in the voice channel radio, causing the RSSI signals to indicate a substantial loss of signal strength from the mobile. This can be done by "pulling" the RSSI lines high or low (depending on the circuit design of the individual cell site radio). Additionally, this can be accomplished by interrupting the RF from the mobile to the cell site radio receiver in some manner.

Yet another method of forcing a call to end is to unkey the cell site transmitter (or sufficiently reduce the output power level of the transmitter) for a period of time sufficient for the mobile to detect loss of SAT and RF. The down side to this approach is that the mobile will basically "drop" the call, and the cell site will record the event as a dropped call, negatively affecting the performance statistics of the site. Another disadvantage of this approach is that most cell site radio channels will go into an alarm condition if the RF power sensing equipment in the cell site detects an unexpected drop in power for a channel.

The present invention is capable of preventing a call from completing through the cellular switch. This is accomplished by modifying the data signals received by the cell site control channel radio during a call attempt on the RECC. In doing so, any of a number of data fields transmitted by the mobile can be modified in a way that makes the call attempt fail. This can be done by either making the fields undecodable or by modifying the data itself into readable, but invalid, values. For instance, if the dialed digits fields are made unreadable, the switch will interpret the call attempt as invalid, thereby rejecting the call attempt. In a variation to this theme, the dialed digits fields can be modified to valid values, the new values representing a dialed destination which is an invalid destination, causing the call to reach a recorded announcement or tone treatment.

A call made through the cellular system of the present invention can also be forced to be re-routed using one of the following three methods.

The first method for re-routing a cellular call is to utilize the conference call feature. In this case, the call interruption system sends a hook flash signal to the cell site (500 ms of 10 KHz). The cell site responds by sending a data message requesting the mobile to send new dialed digits. The call interruption system prevents the mobile from receiving this message by distorting the outbound signal at the modulator circuit of the voice channel radio. Then, the call interruption system sends a data message to the cell site (containing the desired dialed digits) through the discriminator interface. The switch responds by attempting to connect the mobile to the new destination; also by putting the original land party on hold. In some cellular systems, a signal can be sent to the cell site which causes the original call to be ended. If available, this is also done. Once connected to the new destination, the mobile has the option of connecting all three parties by pressing the [Send] button on their phone (thereby sending a hook flash signal to the cell site). In order to prevent this from occurring, the call interruption system uses a 10 KHz filter to notch out the signal from the discriminator output circuit.

The second method for re-routing a cellular call is to use call waiting to introduce a new party (recording or operator) into the call, then preventing the mobile from undoing the connection by using the technique described in the first method of re-routing. In order to accomplish this, the call interruption system dials a call to the mobile unit, causing the call to enter call waiting mode. The call interruption system then forces a call answer by sending a hook flash signal to the cell site. The original party is put on hold, and the mobile is connected to the new call (recording or operator). In some cellular systems, a signal can be sent to the cell site which causes the original call to be ended. If available, this is also done. Once connected to the new destination, the mobile unit has the option of switching conversation between the two other parties by pressing the [Send] button on their phone (thereby sending a hook flash signal to the cell site). In order to prevent this from occurring, the call interruption system uses a 10 KHz filter to notch out the signal from the discriminator output circuit.

The third method of forcing the re-routing of a call through the cellular switch is to modify the data signals received by the cell site control channel radio during a call attempt on the RECC. In doing so, the dialed digits data fields transmitted by the mobile can be modified in a way that makes the call attempt route to a destination other than that dialed by the mobile user. This can be done by modifying the dialed digits data itself into readable, valid values. The cellular system interprets the event as the mobile user dialing the digits decoded from the modified values. The call can be routed to any valid destination such as an operator or interactive voice response system.

Linking the specified call to a local voice frequency interface in the present invention can be accomplished in one of two ways.

In the first method, a physical voice circuit is connected to modulator and demodulator circuits of a radio voice channel, completing a connection to local voice equipment (recording, recorder, tones, etc.). Alternately, both sides of the four wire voice circuit which connects with the voice channel radio transceiver can be electrically interfaced to the local voice equipment. The local voice equipment could additionally be connected to a circuit which links the conversation to remote systems.

A second method for connecting the call to another voice circuit is to force the mobile unit to hand-off to a locally unused frequency, having a local radio transceiver tuned to that frequency with a voice interface to the local radio transceiver. When the mobile unit hands off, the conversation will occur between the mobile and whatever voice interface is used with the local radio transceiver. Forcing a hand-off can be accomplished by sending the mobile unit a hand-off message (via the cell site voice channel radio modulator interface) which contains the new channel for the mobile unit to re-tune to, as well as the SAT to expect on the new radio frequency. Of course the local radio transceiver must produce the assigned SAT in order for the mobile to un-mute for conversation.

During the course of interrupting a call, it may be desirable to make the call unusable for the duration of the process. The present invention can perform this in one of three ways.

First, muting the audio paths of the circuit will minimize the value of the call to the mobile user. This is accomplished by short circuiting an input to the modulator of the voice channel radio transceiver and short circuiting an output of the discriminator of the voice channel radio transceiver. Alternately, this can be accomplished by short circuiting both sides of the four wire voice circuit which connects with the voice channel radio transceiver.

Second, by Injecting an interfering signal into the voice paths of the voice channel radio transceiver, the call will be made not only useless, but annoying as well.

Third, by Introducing interfering RF (on the REVC and/or the FOVC) on the same radio channel frequency, the call can be made noisy. Reducing the RF signal being received by the mobile can also have this effect on the land party. Significantly reducing the transmitted RF power of the cell site voice channel transmitter will make the call noisy to the mobile party.

As an additional option, the call disruption system of the present invention can send a message to the requesting entity that the task of call disruption has been completed. This allows verification of the event.

In the present invention, if a hand-off of the specified call to another voice channel occurs before the call disruption system has completed its actions, then the call disruption will receive the hand-off message which has been transmitted to the mobile unit. The hand-off message includes information specifying the new voice channel to which the mobile unit must tune, as well as the SAT frequency to expect on the new voice channel. The occurrence of this hand-off will mean that the call must be disrupted on the new voice channel. In this case the call disruption system keeps track of the new voice channel assignment for the call. If the call disruption system is linked to voice channel interfaces at the cell site where the new voice channel exists, the call disruption can be automatically pursued on the new voice channel. If the call disruption system is not connected to the new location of the call, it can inform the requesting entity that the call disruption attempt has failed.

Maintaining a table of the channel assignments in the cellular system, the call disruption system can use this table to determine the target channel location of the mobile. This call mapping requires the system to have knowledge of the hand-off candidates for each cell site to which the call disruption equipment is interfaced. This knowledge can be gained in one of two ways. First, the data can be extracted regularly through a query interface to the cellular switch. It can also be learned by observing the hand-off commands issued to mobiles, then watching which voice channels showed the arrival of a new mobile (unaccounted for by voice channel assignments monitored on the FOCC). Over time, it can be deduced how the hand-offs occurred (which voice channel handed off to which other voice channel). Monitoring the data sent on the FOCC will allow the disruption system to determine the initial voice channel assignments of mobiles on that sector.

Assuming that each call interruption module connected to an individual radio voice channel has a unique network identity, the call mapping system will also need to know which module is connected to which radio, operating on which frequency with which SAT. This can be manually maintained by humans, or learned, as described above, by watching the FOCC for new voice channel assignments within its sector, then observing which voice channels in that sector showed the arrival of a new mobile, particularly within a given time frame.

Instead of trying to "chase" the call around the system (following the hand-offs), it is often desirable to prevent the hand-offs in the first place. Preventing hand-offs during the call disruption process can be accomplished in the present invention by distorting or blocking data messages on the FOVC. Hand-offs can also be prevented by turning off or sufficiently reducing the power of the cell site transmitter.

Referring to the drawings, a preferred embodiment of the invention will be described. This embodiment of the present invention enables a requesting entity to force the immediate termination, re-routing, or connection to a local voice interface of a specified cellular telephone call.

FIG. 1 depicts an overall block diagram of an acceptable apparatus for carrying out a preferred embodiment of the present invention. Operating program 122 operates in call mapping system 121 to maintain, in call map data base 123, a mapping of the assignment of mobile calls to voice channels as well as which voice channel is connected to which call interruption module (by address or module ID of the call interruption module).

FIG. 2 is an example of a call mapping table in the call map data base 123 is seen. The column headings at the top of the table indicate which data is being kept in each column of the table. Each row of the table (below the column headings) represents a voice channel in the cellular system to which the call interruption system is connected. The data in each of the columns for any given row represents data as described below.

Original channel frequency column 201 represents the channel frequency number on which this voice channel operates. Original SAT column 202 represents the Signaling Audio Tone (SAT) used by this voice channel. Serving cellular switch column 203 represents the cellular switch which controls this voice channel (and cell site). Serving cell site column 204 represents the cell site which controls this voice channel. Serving cell sector column 205 represents the cell site sector which controls this voice channel. Call interruption module address column 206 represents the identity of the module connected to this voice channel. Call status column 207 represents the status of the call operating on this voice channel. New channel frequency column 208 is used to represent which new channel frequency the mobile tuned to this channel will re-tune to in the case where a call is being handed off from this channel to a new channel. New SAT column 209 is used to represent which new SAT the mobile tuned to this channel will use in the case where a call is being handed off from this channel to a new channel. Mobile-ID column 210 represents the mobile ID or MIN of the mobile currently operating on this channel. To more clearly understand the table in FIG. 2, the following examples are provided.

Viewing the first row of the example table in FIG. 2, it is seen that the original channel frequency column 201 shows the channel frequency number of this voice channel as channel "012". The original SAT column 202 shows the SAT used by this voice channel as "1". The serving cellular switch column 203 shows the cellular switch which controls this voice channel as switch "AN". The serving cell site column 204 shows the cell site which controls this voice channel as cell "146". The serving cell sector column 205 shows the cell site sector which controls this voice channel as sector "A". The call interruption module address column 206 shows the identity of the module connected to this voice channel as module "LAAN146A01". Call status column 207 shows the status of the call operating on this voice channel as "IDLE", indicating that no call is currently operating on this voice channel. Since no hand-off is occurring from this voice channel, new channel frequency column 208 remains blank. Again, since no hand-off is occurring from this voice channel, new SAT column 209 also remains blank. Mobile-ID column 210 is blank, showing that no mobile is currently operating on this channel.

Now viewing the seventh row of the example table in FIG. 2, it is seen that the original channel frequency column 201 shows the channel frequency number of this voice channel as channel "205". The original SAT column 202 shows the SAT used by this voice channel as "1". The serving cellular switch column 203 shows the cellular switch which controls this voice channel as switch "MD". The serving cell site column 204 shows the cell site which controls this voice channel as cell "261". The serving cell sector column 205 shows the cell site sector which controls this voice channel as sector "B". The call interruption module address column 206 shows the identity of the module connected to this voice channel as module "LAMD261B01". Call status column 207 shows the status of the call operating on this voice channel as "HO", indicating that the call currently operating on this voice channel is in the process of being handed off to another voice channel. Since a hand-off is occurring from this original voice channel, new channel frequency column 208 shows that the mobile will retune to channel "112". Again, since a hand-off is occurring from this voice channel, new SAT column 209 shows that the mobile will use SAT "0" once it re-tunes to its new voice channel. Mobile-ID column 210 shows that the mobile currently operating on this channel has the MIN of "7075551212".

Now referring back again to FIG. 1, the overall operation of the communication system of the present invention will be described. Mobile communications with control channel transceiver 162 through cell sector antenna 166 (of single sector cell site 129) can be monitored by control channel module 146 through transceiver to module interface circuit 128. These communications include call attempts, registrations, and page responses of the mobiles operating on the reverse control channel frequency of control channel transceiver 162 as well as the voice channel assignments given to the mobiles on the forward control channel by control channel transceiver 162.

The data collected by control channel module 146 is sent directly to call mapping system 121 via data communications circuit 124, allowing the operating program 122 to update the call map data base 123 in real time with the call activity being monitored for this cell sector at control channel module 146. Note that calls originating using control channel transceiver 162 will only be assigned to voice channels operating under the control of the same sector as control channel transceiver 162. In this embodiment those voice channels are voice channel transceiver 134, voice channel transceiver 135, and voice channel transceiver 136.

As shown in FIG. 1, it can be understood that mobile communications with control channel transceiver 163 through cell sector antenna 167 (of single sector cell site 130) can be monitored by control channel module 150 through transceiver to module interface circuit 128. These communications include call attempts, registrations, and page responses of the mobiles operating on the reverse control channel frequency of control channel transceiver 163 as well as the voice channel assignments given to the mobile units on the forward control channel by control channel transceiver 163.

The data collected by control channel module 150 is sent directly to call mapping system 121 via data communications circuit 125, allowing the operating program 122 to update call map data base 123 in real time with the call activity monitored for this cell sector at control channel module 150. Note that calls originating using control channel transceiver 163 will only be assigned to voice channels operating under the control of the same sector as control channel transceiver 163. In this case those voice channels are voice channel transceiver 137, voice channel transceiver 138, and voice channel transceiver 139.

Now referring again to FIG. 1, it can be understood that mobile communications with control channel transceiver 164 (controlling sector "A" of multiple sector cell site 131) through cell sector antenna 168 can be monitored by control channel module 154 through transceiver to module interface circuit 128. These communications include call attempts, registrations, and page responses of the mobile units operating on the reverse control channel frequency of control channel transceiver 164 as well as the voice channel assignments given to the mobiles on the forward control channel by control channel transceiver 164.

The data collected by control channel module 154 is sent directly to call mapping system 121 via data communications circuit 126, allowing the operating program 122 to update the call map data base 123 in real time with the call activity monitored for this cell sector at control channel module 154. Note that calls originating using control channel transceiver 164 will only be assigned to voice channels operating under the control of the same sector as control channel transceiver 164. In this case those voice channels are voice channel transceiver 140, voice channel transceiver 141, and voice channel transceiver 142.

As shown in FIG. 1, it can be understood that mobile communications with control channel transceiver 165 (controlling sector "B" of multiple sector cell site 131) through cell sector antenna 169 can be monitored by control channel module 158 through transceiver to module interface circuit 128. These communications include call attempts, registrations, and page responses of the mobile units operating on the reverse control channel frequency of control channel transceiver 165 as well as the voice channel assignments given to the mobiles on the forward control channel by control channel transceiver 165.

The data collected by control channel module 158 is sent directly to call mapping system 121 via data communications circuit 127, allowing the operating program 122 to update the call map data base 123 in real time with the call activity monitored for this cell sector at control channel module 158. Note that calls originating using control channel transceiver 165 will only be assigned to voice channels operating under the control of the same sector as control channel transceiver 165. In this case those voice channels are voice channel transceiver 143, voice channel transceiver 144, and voice channel transceiver 145.

Now referring again to FIG. 1, it can be understood that mobile communications with voice channel transceiver 134 through cell sector antenna 166 can be monitored by call interruption module 147 through transceiver to module interface circuit 128. These communications include the hand-off command messages and responses, power-up and power-down command messages and responses, and call termination or end signals to and from the mobile operating on the voice channel frequency of voice channel transceiver 134. In addition to monitoring the forward and reverse voice channel data streams, call interruption module 147 continuously monitors the RSSIs of the diversity receiver section of voice channel transceiver 134 as well as the transmit key condition of voice channel transceiver 134. These pieces of information are useful for indicating whether a mobile is operating on the channel of voice channel transceiver 134.

The data collected by call interruption module 147 is sent directly to call mapping system 121 via data communications circuit 124, allowing the operating program 122 to update the call map data base 123 in real time with the call activity monitored for this voice channel. Note that each of the voice channels in the system are physically connected to a unique call interruption module. Each of the call interruption modules are identical in form and operation with the exception of their module-ID and which voice channel they are connected to physically.

So it can be seen in FIG. 1 that in single sector cell site 129 the voice channel transceiver 134 is physically connected to the call interruption module 147 through the transceiver to the module interface circuit 128, the call interruption module 147 communicating with call mapping system 121 via data communications circuit 124. It can also be seen that voice channel transceiver 135 is physically connected to call interruption module 148 through transceiver to module interface circuit 128, call interruption module 148 communicating with call mapping system 121 via data communications circuit 124. It can also be seen that voice channel transceiver 136 is physically connected to call interruption module 149 through transceiver to module interface circuit 128, the call interruption module 149 communicating with call mapping system 121 via data communications circuit 124. In the other single sector cell site 130 shown in FIG. 1, it can be seen that voice channel transceiver 137 is physically connected to call interruption module 151 through transceiver to module interface circuit 128, call interruption module 151 communicating with call mapping system 121 via data communications circuit 125. It can also be seen that voice channel transceiver 138 is physically connected to call interruption module 152 through transceiver to module interface circuit 128, call interruption module 152 communicating with call mapping system 121 via data communications circuit 125. It can also be seen that voice channel transceiver 139 is physically connected to call interruption module 153 through transceiver to module interface circuit 128, call interruption module 153 communicating with call mapping system 121 via data communications circuit 125. In sector "A" of multiple sector cell site 131 shown in FIG. 1, it can be seen that voice channel transceiver 140 is physically connected to call interruption module 155 through transceiver to module interface circuit 128, the call interruption module 155 communicating with call mapping system 121 via data communications circuit 126. It can also be seen that voice channel transceiver 141 is physically connected to call interruption module 156 through transceiver to module interface circuit 128, call interruption module 156 communicating with call mapping system 121 via data communications circuit 126. It can also be seen that voice channel transceiver 142 is physically connected to call interruption module 157 through transceiver to module interface circuit 128, call interruption module 157 communicating with call mapping system 121 via data communications circuit 126. In sector "B" of multiple sector cell site 131 shown in FIG. 1, it can be seen that voice channel transceiver 143 is physically connected to call interruption module 159 through transceiver to module interface circuit 128, call interruption module 159 communicating with call mapping system 121 via data communications circuit 127. It can also be seen that voice channel transceiver 144 is physically connected to call interruption module 160 through transceiver to module interface circuit 128, call interruption module 160 communicating with call mapping system 121 via data communications circuit 127. It can also be seen that voice channel transceiver 145 is physically connected to call interruption module 161 through transceiver to module interface circuit 128, call interruption module 161 communicating with call mapping system 121 via data communications circuit 127.

While the above-described radio channel interfaces collect data which provide for keeping track of call activities in a centralized call map data base 123, the voice channel interfaces used by the call interruption modules are also used to control call activities as described in detail later. As seen in FIG. 1, a requesting entity can communicate with the operating program 122 operating in call mapping system 121 through communications port 133 and data communications circuit 132. In this way the requesting entity can choose to receive copies of the real-time data flowing between the call mapping system 121 and any call interruption modules or control channel modules which are connected to call mapping system 121. This real-time pre-call, mid-call, and post-call data can then be used for a variety of other applications by the requesting entity. The requesting entity can also send command messages to the operating program 122 through data communications circuit 132 and communications port 133, instructing a specified interruption for a specified call.

When a call interruption command message is received by the operating program 122, the command typically specifies the mobile-ID of the mobile whose call is to be interrupted. The operating program 122 then searches call map data base 123 for the row containing the specified mobile-ID in mobile-ID column 210. If a row is not found containing this data, the operating program 122 sends a message to the requesting entity (via communications port 133 and data communications circuit 132) indicating that this mobile is not known to be operational on any voice channel at this time. However, if a row is found containing this data, the operating program 122 sends a message to the appropriate call interruption module commanding that call interruption module to immediately interrupt the call on its voice channel as specified. When the call interruption module completes the specified interruption of the call on the voice channel to which it is physically connected, it sends a message to call mapping system 121 indicating the final status of the interruption activity. The call mapping system 121 then immediately passes this message back to the requesting entity.

Figure 3:
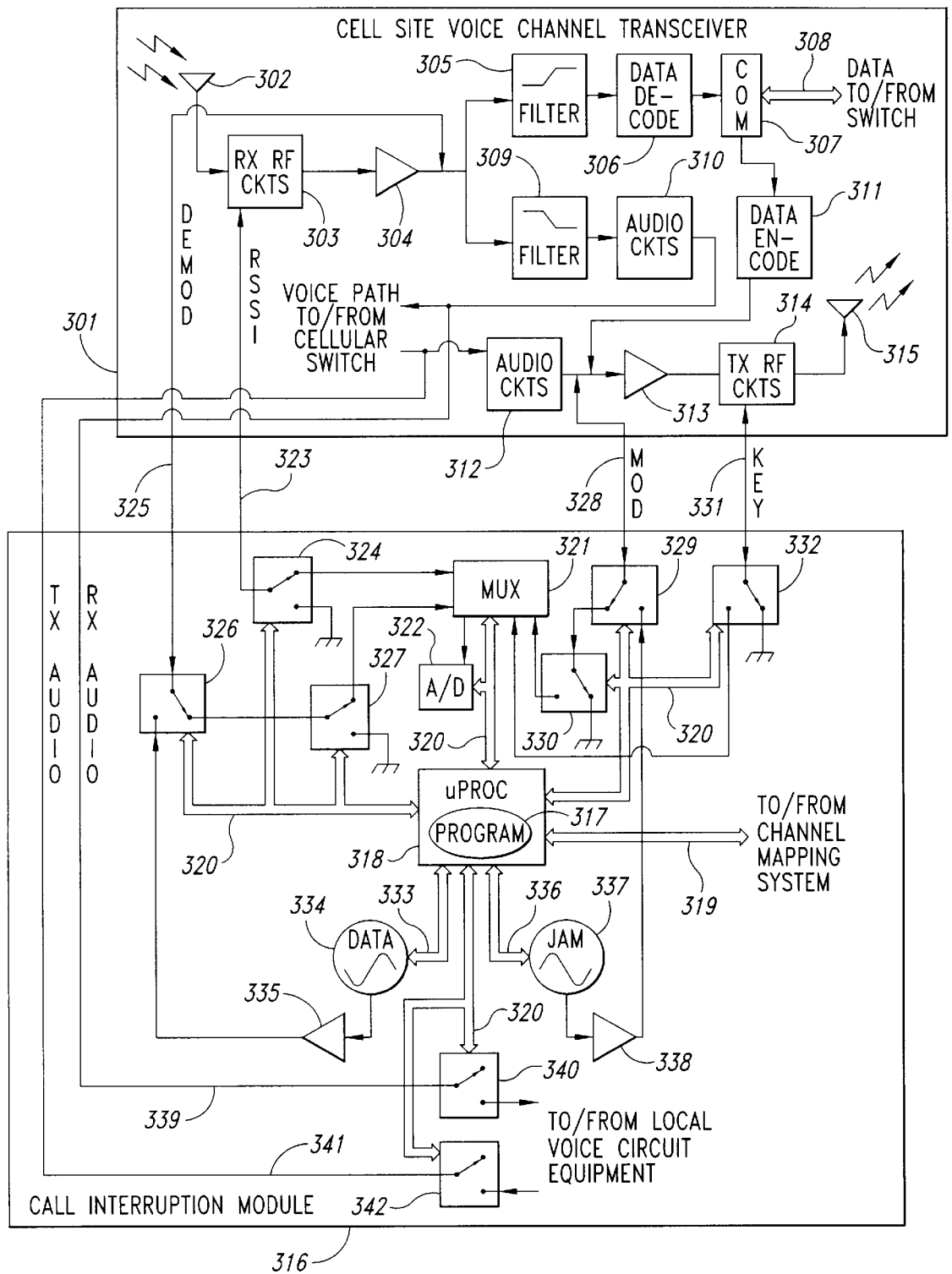
FIG. 3 is a block diagram of the cell site voice channel interface circuits of the preferred embodiment of the present invention.

Now referring to FIG. 3, a simplified block diagram of the cell site voice channel interface circuits of the preferred embodiment of the present invention is shown. Each call interruption module 316 is physically interfaced to a separate and unique voice channel transceiver 301 in the cellular system. As shown, there are six separate interface points between call interruption module 316 and voice channel transceiver 301. These are RSSI signal interface line 323, demodulator signal interface line 325, modulator signal interface line 328, transmitter key signal interface line 331, receive audio interface line 339, and transmit audio interface line 341.

Still referring to FIG. 3, it can be seen that a mobile unit's RF signal arriving at cell sector receive antenna 302 propagates into receiver RF circuits 303 where the RSSI of the mobile signal is measured while the signal is converted to the intermediate frequency (IF) according to well known RF receiver technology. The RSSI signal is monitored by call interruption module 316 through RSSI signal interface line 323, providing call interruption module 316 with continuous RSSI signals as they are measured by voice channel transceiver 301. After being processed by receiver RF circuits 303, the IF signal is sent to demodulator 304 where the baseband signal (audio in this case) is derived. The output of demodulator 304 is monitored by call interruption module 316 through demodulator signal interface line 325, providing call interruption module 316 with all baseband signals demodulated by voice channel transceiver 301.

In voice channel transceiver 301, the signal output from demodulator 304 is split into two paths. The first path takes the signal to the input of high pass filter 305 which passes the high frequency SAT and data portion of the signal to Manchester data decoder 306. Manchester data decoder 306 converts the 10 KHz analog Manchester encoded signal into digital signal bits as well as detecting the incoming SAT phase. Both of these information outputs are then fed to communications port 307 for passage to the cellular switch via data communications circuit 308. The second path for the output signal from demodulator 304 is through low pass filter 309 which passes only the voice portion of the signal to the receive baseband audio circuits 310 for further transmission to the cellular switch and, eventually, the land party connected to the call. A receive audio interface line 339 taps the voice signal at this point and provides an interface to the signal for call interruption module 316. This summarizes the normal receive signal path through voice channel transceiver 301.

The transmit signals path through voice channel transceiver 301 has two origination sources. First, the cellular switch sends data to the voice channel transceiver 301 via data communications circuit 308 into communications port 307 for passage to Manchester data encoder 311. Manchester data encoder 311 converts the data from the cellular switch into Manchester encoded analog signals which are sent to the input of modulator 313 mixed with a specified SAT tone. At the input of modulator 313, modulator signal interface line 328 provides an interface for call interruption module 316.

The second input which modulator 313 receives is a voice signal which originates with the land party connected to the call, passes through the cellular switch, then arrives at the input of transmit baseband audio circuits 312. At the input of transmit baseband audio circuits 312, transmit audio interface line 341 provides an interface for call interruption module 316. This voice signal is then processed by transmit baseband audio circuits 312 before reaching the input of modulator 313. The output of modulator 313 is sent to the input of the transmit RF circuits 314 which convert the baseband signals to the operating RF transmit frequency using conventional technology. Transmitter key signal interface line 331 provides an interface for call interruption module 316 to the well known transmitter keying signal used in transmit RF circuits 314. After being converted and amplified in the transmit RF circuits 314, the RF signal is sent out cell sector transmit antenna 315 for propagation to the mobile unit operating on the voice channel. This summarizes the normal transmit signal path through voice channel transceiver 301.

The operation of the call interruption module 316, shown in FIG. 3, will be described here. Program 317 operating in microprocessor 318 communicates with call mapping system 121 via data communications circuit 319 for receiving command messages from call mapping system 121 and providing data to call mapping system 121. Microprocessor 318 controls the operation of digitally controlled analog switches 324, 326, 327, 329, 330, 332, 340, and 342 via control and data bus 320. Microprocessor 318 also controls the operation of Manchester data and signaling tone signal generator 334 via signal generator control bus 333. Microprocessor 318 additionally controls the operation of Manchester data jamming signal generator 337 via signal generator control bus 336. Microprocessor 318 additionally controls the operation of multiplexer 321 via control and data bus 320. Microprocessor 318 additionally reads the digital output of analog to digital converter 322 via control and data bus 320. Essentially, all operations performed by call interruption module 316 are controlled by the program 317 operating in microprocessor 318.

Call interruption module 316 performs many individual tasks relating to interruption of a call, as well as keeping a continuous status of several conditions relating to voice channel transceiver 301. What will be described next are the functional operations of call interruption module 316 as they relate to monitoring the status of voice channel transceiver 301.

Referring again to FIG. 3, it can be seen that, in one state, digitally controlled analog switch 324 passes signals arriving from RSSI signal interface line 323 to an input of multiplexer 321. Multiplexer 321 regularly switches these signals to an analog to digital converter 322 which digitizes these signals and communicates its digital representations of them to microprocessor 318 via control and data bus 320. In this manner, microprocessor 318 can continually update a status of this condition.

Referring again to FIG. 3, it can also be seen that, in one state, digitally controlled analog switch 326 passes signals arriving from demodulator signal interface line 325 to digitally controlled analog switch 327 which, when in one state then passes these signals to an input of multiplexer 321. Multiplexer 321 regularly switches these signals to analog to the digital converter 322 which digitizes these signals and communicates its digital representations of them to microprocessor 318 via control and data bus 320. In this manner, microprocessor 318 can continually read these signals into memory. Software 317 operating in microprocessor 318 can then analyze these signals, decoding any received Manchester encoded data signals, dual-tone multi-frequency (DTMF) signals, Signaling Tones (ST), SAT, or any number of other analog signals seen arriving on demodulator signal interface line 325. In this manner, the status of any conditions related to these signals can be updated continuously.

Referring again to FIG. 3, it can also be seen that, in one state, digitally controlled analog switch 329 passes signals arriving from modulator signal interface line 328 to digitally controlled analog switch 330 which, when in one state then passes these signals to an input of multiplexer 321. Multiplexer 321 regularly switches these signals to the analog to digital converter 322 which digitizes these signals and communicates its digital representations of them to microprocessor 318 via control and data bus 320. In this manner, microprocessor 318 can continually read these signals into memory. The program 317 operating in microprocessor 318 can then analyze these signals, decoding any received Manchester encoded data signals, dual-tone multi-frequency (DTMF) signals, Signaling Tones (ST), SAT, or any number of other analog signals seen arriving on modulator signal interface line 328. In this manner, the status of any conditions related to these signals can be updated continuously.

Referring again to FIG. 3, it can be seen that, in one state, digitally controlled analog switch 332 passes signals arriving from transmitter key signal interface line 331 to an input of multiplexer 321. Multiplexer 321 regularly switches these signals to the analog to digital converter 322 which digitizes these signals and communicates its digital representations of them to microprocessor 318 via control and data bus 320. In this manner, microprocessor 318 can continually update a status of this condition.

The value of the information updated as described above is seen in the example where the program 317 operating in microprocessor 318 updates the status of the transmit key condition to show that the transmit RF circuits 314 of voice channel transceiver 301 are keyed. This condition only occurs when a call is assigned to voice channel transceiver 301. In this way, the program 317 operating in microprocessor 318 can determine that a call is in progress using voice channel transceiver 301. If the keyed condition changes status to unkeyed, the program 317 operating in microprocessor 318 can determine that the call in progress using voice channel transceiver 301 is no longer in operation on this voice channel. This condition could be due to several possibilities. First, the call might have been handed off to another voice channel. In this case the program 317 operating in microprocessor 318 would have decoded a Manchester message from modulator signal interface line 328 commanding the mobile to hand-off to another voice channel. The call might also have been ended by the mobile user. In this case program 317 operating in microprocessor 318 would have decoded a 1.8 second duration burst of ST signal from demodulator signal interface line 325. As can be seen by these simple examples, proper analysis of the combined statuses provides software 317 operating in microprocessor 318 the ability to interpret the conditions of any call (or lack thereof) operating on voice channel transceiver 301.

The tasks, which call interruption module 316 performs, relating to interruption of a call are described individually below. As individual tasks, it may not be obvious how they relate to the interruption of a call, but in various combinations these tasks can perform different types of specified interruptions of a call operating on voice channel transceiver 301. How these tasks are combined to perform macro-tasks is described later in the software operation section of this specification.

One task which is performed by call interruption module 316 is that of forcing the unkeying of the transmit RF circuits 314 of voice channel transceiver 301. This is accomplished by the program 317 operating in microprocessor 318, via control and data bus 320, commanding digitally controlled analog switch 332 to switch to the state where transmitter key signal interface line 331 is connected to ground through digitally controlled analog switch 332.

Another task which is performed by call interruption module 316 is that of shorting the signal from modulator signal interface line 328 to ground (effectively removing any modulation signals from the input to modulator 313). This is accomplished by the program 317 operating in microprocessor 318, via control and data bus 320, commanding digitally controlled analog switches 329 and 330 to switch to the state where modulator signal interface line 328 is connected to ground through digitally controlled analog switches 329 and 330.

Another task which is performed by call interruption module 316 is that of the shorting to ground of the RSSI signals of voice channel transceiver 301. This is accomplished by the program 317 operating in microprocessor 318, via control and data bus 320, commanding digitally controlled analog switch 324 to switch to the state where RSSI signal interface line 323 is connected to ground through digitally controlled analog switch 324 effectively creating an appearance to voice channel transceiver 301 that there are no RF signals being received at the cell sector receive antenna 302.

Yet another task which is performed by call interruption module 316 is that of shorting the signal from demodulator signal interface line 325 to ground (effectively removing any demodulated base band signals from the output of demodulator 304). This is referred to later in the specification as "sending GUARD" (effectively "GUARDING" against the reception of certain signals from a mobile unit). This is accomplished by the program 317 operating in microprocessor 318, via control and data bus 320, commanding digitally controlled analog switches 326 and 327 to switch to the state where demodulator signal interface line 325 is connected to ground through digitally controlled analog switches 326 and 327.

Yet another task which is performed by call interruption module 316 is that of connecting the signals from receive audio interface line 339 and transmit audio interface line 341 to local voice circuit equipment (effectively providing a voice link between the calling, party, the called party, and the local voice circuit equipment). This is accomplished by the program 317 operating in microprocessor 318, via control and data bus 320, commanding digitally controlled analog switches 340 and 342 to switch to the state where receive audio interface line 339 and transmit audio interface line 341 are connected to the local voice circuit equipment through digitally controlled analog switches 340 and 342.

Another task which is performed by call interruption module 316 is that of injecting a signal into modulator signal interface line 328 (effectively providing modulation signals such as Manchester encoded analog signals to the input to modulator 313). This is accomplished by the program 317 operating in microprocessor 318, via control and data bus 320, commanding digitally controlled analog switch 329 to switch to the state where modulator signal interface line 328 is connected to the output of buffer circuit 338 through digitally controlled analog switch 329. After this connection is made, the program 317 operating in microprocessor 318, via signal generator control bus 336, commands Manchester data jamming signal generator 337 to generate a specified signal which is buffered by buffer circuit 338 then connected to the input of modulator 313 through digitally controlled analog switch 329 and modulator signal interface line 328.

Yet another task which is performed by call interruption module 316 is that of injecting a signal into demodulator signal interface line 325 (effectively providing analog signals at the output of demodulator 304 as though received from a mobile unit). An example of this would be the injection of 50 ms of ST (referred to as a "HOOKFLASH"). This is accomplished by the program 317 operating in microprocessor 318, via control and data bus 320, commanding digitally controlled analog switch 326 to switch to the state where demodulator signal interface line 325 is connected to the output of buffer circuit 335 through digitally controlled analog switch 326. After this connection is made, the program 317 operating in microprocessor 318, via signal generator control bus 333, commands the Manchester data and signaling tone signal generator 334 to generate a specified signal which is buffered by buffer circuit 335 then connected to the output of demodulator 304 through digitally controlled analog switch 326 and demodulator signal interface line 325.

A person of ordinary skill in this art will see that the proper combinations of these individual tasks performed by call interruption module 316 will provide for various types of interruptions of a call operating on voice channel transceiver 301. For example, if a call were operating on voice channel transceiver 301 and the program 317 operating in microprocessor 318 received a message from the call mapping system 121 (via data communications circuit 319) to terminate (or end) the call then program 317 would cause the injection of a 1.8 second duration burst of 10 KHz (ST) signal into demodulator signal interface line 325 (effectively providing a "disconnect request" signal at the output of demodulator 304). This is accomplished by the program 317 operating in microprocessor 318, via control and data bus 320, commanding digitally controlled analog switch 326 to switch to the state where demodulator signal interface line 325 is connected to the output of buffer circuit 335 through the digitally controlled analog switch 326. After this connection is made, the program 317 operating in microprocessor 318, via signal generator control bus 333, commands Manchester data and signaling tone signal generator 334 to generate a 1.8 second burst of ST signal which is buffered by buffer circuit 335 then connected to the output of demodulator 304 through digitally controlled analog switch 326 and demodulator signal interface line 325. This action would cause the cellular switch to receive data indicating that the mobile unit has requested a disconnect of its call in progress on voice channel transceiver 301. The cellular switch would then command voice channel transceiver 301 to unkey its transmit RF circuits 314, thereby ending the connection to the mobile unit. The changing condition of the keyed state of transmit RF circuits 314 is detected by the program 317 operating in microprocessor 318 (as described above) indicating that the mobile unit is no longer in operation on voice channel transceiver 301. This information combined with the fact that no hand-off command was decoded by the program 317 (as described above) would indicate that the call interruption attempt was successful.

In the simplified flow charts describing (later in this specification) the operation of the program 317, it will be seen that many possible combinations of the tasks performed by call interruption module 316 can be applied to gain various call interruption results.

In order for call mapping system 121 to keep track (in real time) of the original voice channel assignments of mobile units, it is necessary for call mapping system 121 to receive data monitored on the cellular system control channels where the voice channel assignments take place.

Figure 4:
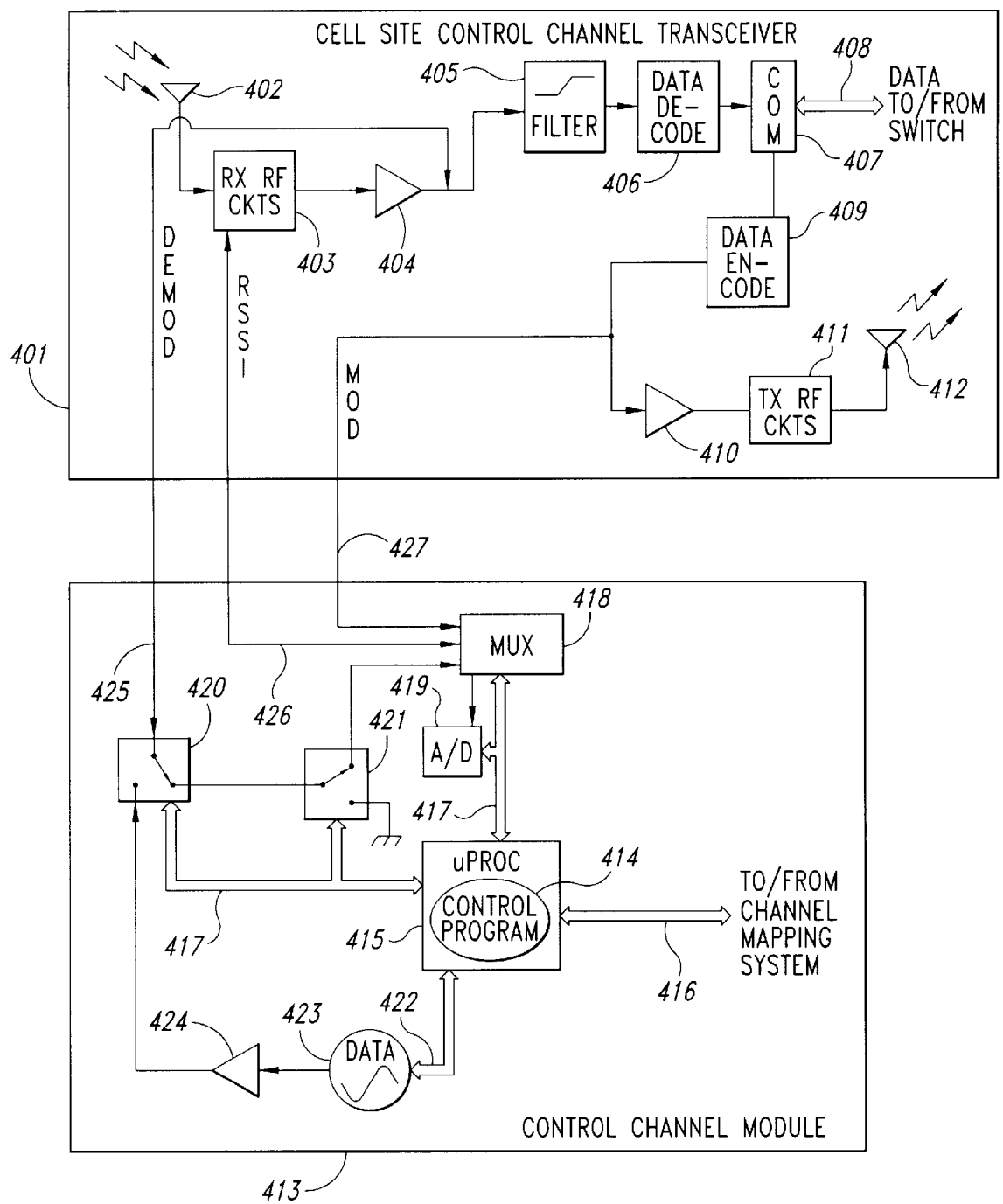
FIG. 4 is a block diagram of the cell site control channel interface circuits of the preferred embodiment of the present invention.

In FIG. 4 the interface of control channel module 413 to cell site control channel transceiver 401 is shown. The information monitored by a control program 414 operating in microprocessor 415 in control channel module 413 is communicated to call mapping system 121 via data communications circuit 416.

Now referring to FIG. 4, a simplified block diagram of the cell site control channel interface circuits of the preferred embodiment of the present invention is shown. Each control channel module 413 is physically interfaced to a separate and unique cell site control channel transceiver 401 in the cellular system. As shown, there are three separate interface points between control channel module 413 and cell site control channel transceiver 401. These are RSSI signal interface line 426, demodulator signal interface line 425, and modulator signal interface line 427.

Still referring to FIG. 4, it can be seen that a mobile RF signal arriving at cell sector receive antenna 402 propagates into receiver RF circuits 403 where the RSSI of the mobile signal is measured while the signal is converted to the intermediate frequency (IF) according to well known RF receiver technology. The RSSI signal is monitored by control channel module 413 through RSSI signal interface line 426, providing control channel module 413 with continuous RSSI signals as they are measured by cell site control channel transceiver 401. After being processed by receiver RF circuits 403, the IF signal is sent to demodulator 404 where the baseband signal (audio in this case) is derived. The output of demodulator 404 is monitored by control channel module 413 through demodulator signal interface line 425, providing control channel module 413 with all baseband signals demodulated by cell site control channel transceiver 401.

In cell site control channel transceiver 401, the signal output from demodulator 404 is sent to the input of high pass filter 405 which passes the high frequency data portion of the signal to Manchester data decoder 406. Manchester data decoder 406 converts the 10 KHz analog Manchester encoded signal into digital signal bits. This information output is then fed to communications port 407 for passage to the cellular switch via data communications circuit 408. This summarizes the normal receive signal path through cell site control channel transceiver 401.

The path of the transmit signal through the cell site control channel transceiver 401 originates at the cellular switch. The cellular switch sends data to the cell site control channel transceiver 401 via data communications circuit 408 into communications port 407 for passage to Manchester data encoder 409. Manchester data encoder 409 converts the data from the cellular switch into Manchester encoded analog signals which are sent to the input of modulator 410. At the input of modulator 410, modulator signal interface line 427 provides an interface for control channel module 413. The output of modulator 410 is sent to the input of the transmit RF circuits 411 which convert the baseband signals to the operating RF transmit frequency using conventional technology. After being converted and amplified in the transmit RF circuits 411, the RF signal is sent out using the cell sector transmit antenna 412 for propagation to the mobile units operating on the control channel. This summarizes the normal transmit signal path through cell site control channel transceiver 401.

The operation of control channel module 413 shown in FIG. 4 will be described here. The control program 414 operating in microprocessor 415 communicates with call mapping system 121 via data communications circuit 416 for receiving command messages from call mapping system 121 and providing data to call mapping system 121. Microprocessor 415 controls the operation of digitally controlled analog switches 420 and 421 via control and data bus 417. Microprocessor 415 also controls the operation of Manchester data and signaling tone signal generator 423 via signal generator control bus 422. Microprocessor 415 additionally controls the operation of multiplexer 418 via control and data bus 417. Microprocessor 415 additionally reads the digital output of an analog to digital converter 419 via control and data bus 417. Essentially, all operations performed by control channel module 413 are controlled by the control program 414 operating in microprocessor 415.

Control channel module 413 performs specific tasks relating to interruption of a call, as well as keeping a continuous status of several conditions relating to cell site control channel transceiver 401. What will be described next are the functional operations of control channel module 413 as they relate to monitoring the status of cell site control channel transceiver 401.

Referring again to FIG. 4, it can also be seen that, in one state, digitally controlled analog switch 420 passes signals arriving from demodulator signal interface line 425 to digitally controlled analog switch 421 which, when in one state then passes these signals to an input of multiplexer 418. Multiplexer 418 regularly switches these signals to the analog to digital converter 419 which digitizes these signals and communicates its digital representations of them to microprocessor 415 via control and data bus 417. In this manner, microprocessor 415 can continually read these signals into memory. The control program 414 operating in microprocessor 415 can then analyze these signals, decoding any received Manchester encoded data signals seen arriving on demodulator signal interface line 425. In this manner, the status of any conditions related to these signals can be updated continuously.

Referring again to FIG. 4, it can also be seen that modulator signal interface line 427 passes these signals to an input of multiplexer 418. Multiplexer 418 regularly switches these signals to analog to digital converter 419 which digitizes these signals and communicates its digital representations of them to microprocessor 415 via control and data bus 417. In this manner, microprocessor 415 can continually read these signals into memory. The control program 414 operating in microprocessor 415 can then analyze these signals, decoding any received Manchester encoded data signals seen arriving on modulator signal interface line 427. In this manner, the status of any conditions related to these signals can be updated continuously.

Referring again to FIG. 4, it can also be seen that RSSI signal interface line 426 passes these signals to an input of multiplexer 418. Multiplexer 418 regularly switches these signals to analog to digital converter 419 which digitizes these signals and communicates its digital representations of them to microprocessor 415 via control and data bus 417. In this manner, microprocessor 415 can continually read these signals into memory. The control program 414 operating in microprocessor 415 can then analyze these signals seen arriving on RSSI signal interface line 426. In this manner, the status of any conditions related to these signals can be updated continuously.

The value of the monitoring of these signals by control channel module 413 is that by decoding the Manchester encoded analog signals on the forward and reverse control channel paths and passing this data back to call mapping system 121, control channel module 413 provides call mapping system 121 with the ability to keep track of original voice channel assignments made to specific Mobil-IDs.

In addition to monitoring conditions present on cell site control channel transceiver 401, control channel module 413 performs specific tasks related to interrupting calls which are attempting to originate on the control channel. Viewed individually, a person of ordinary skill in this art will understand from reading this specification how specific combinations of these tasks will effect a call interruption for a mobile unit attempting to a call on the control channel. These individual tasks are described below.

One task which is performed by control channel module 413 is that of shorting the signal from demodulator signal interface line 425 to ground (effectively removing any modulation signals from the input to demodulator 404). This is accomplished by the control program 414 operating in microprocessor 415, via control and data bus 417, commanding digitally controlled analog switches 420 and 421 to switch to the state where demodulator signal interface line 425 is connected to ground through digitally controlled analog switches 420 and 421.

Another task which is performed by control channel module 413 is that of injecting a signal into demodulator signal interface line 425 (effectively providing analog signals at the output of demodulator 404). This is accomplished by the control program 414 operating in microprocessor 415, via control and data bus 417, commanding digitally controlled analog switch 420 to switch to the state where demodulator signal interface line 425 is connected to the output of buffer circuit 424 through digitally controlled analog switch 420. After this connection is made, the control program 414 operating in microprocessor 415, via signal generator control bus 422, commands the Manchester data and signaling tone signal generator 423 to generate a specified signal which is buffered by buffer circuit 424 then connected to the output of demodulator 404 through digitally controlled analog switch 420 and demodulator signal interface line 425.

In one alternate embodiment of the invention, the control program 414 operating in microprocessor 415 contains instructions to receive a list of mobile-IDs who's call attempts to interrupt. In this embodiment, control channel module 413 would monitor the reverse control channel data, decoding mobile-IDs as the data streams by. Immediately upon identifying a mobile-ID on the list for interruption, the control program 414 would cause the circuits of control channel module 413 to perform the task of shorting the signal from demodulator signal interface line 425 to ground as described above (effectively removing the Manchester encoded data signals transmitted by the mobile from the input to demodulator 404). Shorting this signal for an appropriate amount of time (approximately 100 milliseconds) will prevent Manchester data decoder 406 in cell site control channel transceiver 401 from decoding the remaining data being transmitted by the mobile unit in its attempt to originate or receive the call. This will result in the call being rejected at the cellular switch as invalid.

In another embodiment of the invention, the control program 414 operating in microprocessor 415 would in the scenario described above (upon identifying a mobile-ID on the list for interruption) cause the circuits of control channel module 413 to immediately perform the task of injecting a signal into demodulator signal interface line 425 (effectively making unreadable the signals at the output of demodulator 404). Various types of signals injected at this point would have the effect of preventing Manchester data decoder 406 in cell site control channel transceiver 401 from decoding the remaining data being transmitted by the mobile unit in its attempt to originate or receive the call. This will result in the call being rejected at the cellular switch as invalid.

Figure 5:
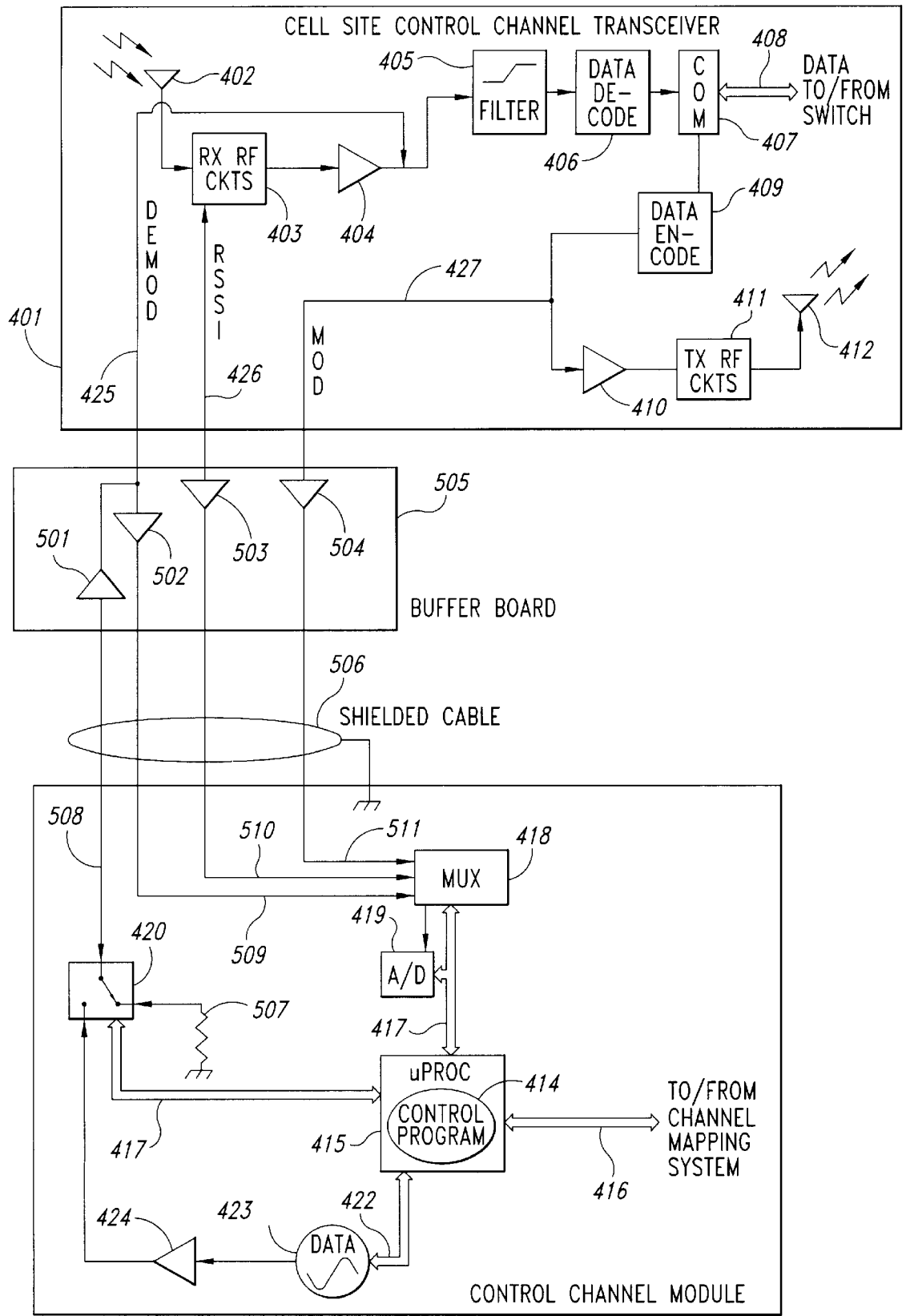
FIG. 5 is a block diagram of the cell site control channel interface circuits according to an alternate embodiment of the present invention.

FIG. 5 shows a simplified block diagram of an alternative embodiment of the present invention that uses a buffer board 505 as an interface between the control channel module 413 and the cell site control channel transceiver 401. The information monitored by the control program 414 operating in microprocessor 415 in control channel module 413 is communicated to call mapping system 121 via data communications circuit 416.

Now referring to FIG. 5, each control channel module 413 is physically interfaced to a separate and unique cell site control channel transceiver 401 in the cellular system through an separate buffer board 505 for allowing control channel module 413 to be remotely located from cell site control channel transceiver 401 at a distance of up to seventy five feet. As shown, there are three separate interface points between control channel module 413 and cell site control channel transceiver 401. These are RSSI signal interface line 426, demodulator signal interface line 425, and modulator signal interface line 427.

The operation of cell site control channel transceiver 401 is exactly as explained above in the description of FIG. 4. Referring again to FIG. 5, it can be seen that control channel module 413 only differs slightly in this embodiment of the invention.

In FIG. 5, buffer board 505 performs the function of allowing control channel module 413 to be remotely located from cell site control channel transceiver 401, buffering the signals passed between control channel module 413 and cell site control channel transceiver 401. Buffer circuit 502 provides sufficient line driving capability to deliver signals from demodulator signal interface line 425 through demodulator signal interface extension line 509 of shielded cable 506 to arrive at control channel module 413 in substantially the same condition as they left cell site control channel transceiver 401. Note that these signals are delivered directly then from demodulator signal interface extension line 509 to an input of multiplexer 418, which in turn regularly switches this signal source to the input of analog to digital converter 419 which digitizes these signals and communicates its digital representations of them to microprocessor 415 via control and data bus 417. This allows the control program 414 to continuously track the conditions represented by these signals.

Referring again to FIG. 5, buffer circuit 503 provides sufficient line driving capability to deliver signals from RSSI signal interface line 426 through RSSI signal interface extension line 510 of shielded cable 506 to arrive at control channel module 413 in substantially the same condition as they left cell site control channel transceiver 401. Note that these signals are delivered directly then from RSSI signal interface extension line 510 to an input of multiplexer 418, which in turn regularly switches this signal source to the input of analog to digital converter 419 which digitizes these signals and communicates its digital representations of them to microprocessor 415 via control and data bus 417. This allows the control program 414 to continuously track the conditions represented by these signals.

Referring again to FIG. 5, buffer circuit 504 provides sufficient line driving capability to deliver signals from modulator signal interface line 427 through modulator signal interface extension line 511 of shielded cable 506 to arrive at control channel module 413 in substantially the same condition as they left cell site control channel transceiver 401. Note that these signals are delivered directly via modulator signal interface extension line 511 to an input of multiplexer 418, which in turn regularly switches this signal source to the input of the analog to digital converter 419 which digitizes these signals and communicates its digital representations of them to microprocessor 415 via control and data bus 417. This allows the control program 414 to continuously track the conditions represented by these signals.

Referring again to FIG. 5, signal amplifier 501 provides sufficient amplification to deliver signals from receiver data injection interface line 508 of shielded cable 506 through demodulator signal interface line 425 to arrive at the output of demodulator 404 in cell site control channel transceiver 401 in substantially the same condition as they left control channel module 413.

Thus, due to buffer board 505, proper monitoring of and injection of signals as they relate to cell site control channel transceiver 401 occur when control channel module 413 is located remotely from cell site control channel transceiver 401. Note that all of the signals monitored by this embodiment of the invention are the same ones monitored in the embodiment as described in FIG. 4. The control program 414 uses this monitored information in substantially the same manner as described before.

The two main tasks related to call interruption are performed slightly differently in this embodiment of the invention as described below.

The first task related to call interruption, which is performed by control channel module 413, is that of shorting the signal from demodulator signal interface line 425 to ground (effectively removing any modulation signals from the input to demodulator 404). This is accomplished by the control program 414 operating in microprocessor 415, via control and data bus 417, commanding digitally controlled analog switch 420 to switch to the state where receiver data injection interface line 508 is connected to bias resistor 507 through digitally controlled analog switch 420. This biases signal amplifier 501 in buffer board 505 in such a way as to cause the output impedance of signal amplifier 501 to have an extremely low impedance. The result of this is that demodulator signal interface line 425 is effectively shorted to ground through the output stage of signal amplifier 501

(effectively removing any modulation signals from the input to demodulator 404). If bias resistor 507 is not connected to the input of signal amplifier 501, signal amplifier 501 goes to a state of having a very high output impedance until signals at its input drive it into normal bias operation. In this state, signals appearing on demodulator signal interface line 425 remain unaffected, passing normally into the input of demodulator 404.

The other task, which is performed by control channel module 413, is that of injecting a signal into demodulator signal interface line 425 (effectively providing analog signals at the output of demodulator 404). This is accomplished by the control program 414 operating in microprocessor 415, via control and data bus 417, commanding digitally controlled analog switch 420 to switch to the state where receiver data injection interface line 508 is connected to the output of buffer circuit 424 through digitally controlled analog switch 420. After this connection is made, the control program 414 operating in microprocessor 415, via signal generator control bus 422, commands the Manchester data and signaling tone signal generator 423 to generate a specified signal which is buffered by buffer circuit 424 then connected to the output of demodulator 404 through digitally controlled analog switch 420, receiver data injection interface line 508, signal amplifier 501, and demodulator signal interface line 425.

In all other respects, control channel module 413 operates substantially similar to the embodiment described using FIG. 4.

Figure 6:
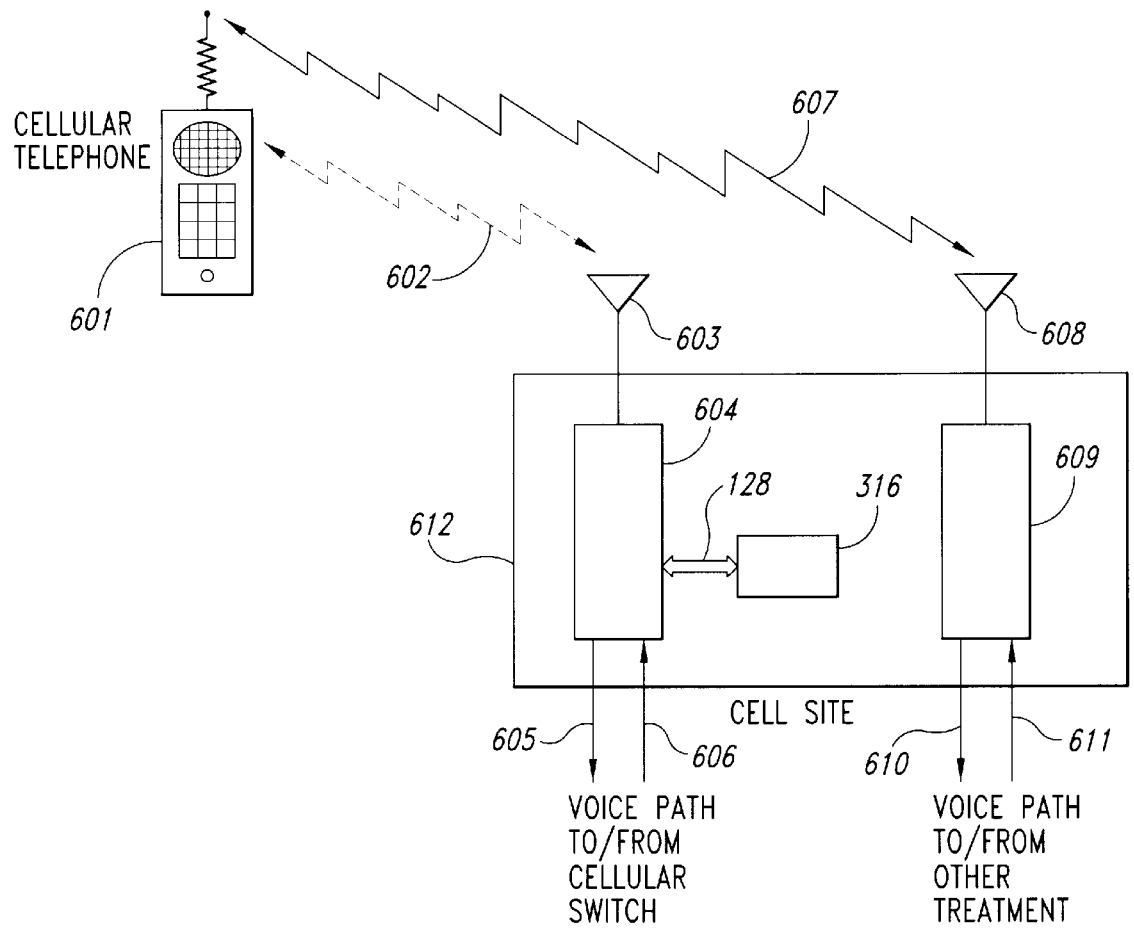
FIG. 6 is a block diagram of the local radio channel interface as it is used to connect a call to a new voice path according to the preferred embodiment of the present invention.

In FIG. 6 a simplified block diagram is shown of the local radio channel interface as it is used in a forced hand-off operation to connect a call to a new voice path according to the preferred embodiment of the present invention.

Referring now to FIG. 6, cellular telephone 601 is originally connected to a call operating in cell site 612 through original voice channel signal path 602, original voice channel antenna 603, original voice channel transceiver 604, original voice path to cellular switch 605, and original voice path from cellular switch 606. Call interruption module 316 is interfaced to original voice channel transceiver 604 through transceiver to module interface circuit 128 allowing call interruption module 316 to interrupt the normal conditions of the call.

Referring back now to FIG. 3, note that voice channel transceiver 301 is functionally equivalent to original voice channel transceiver 604. Call interruption module 316 accomplishes re-routing of the mobile unit call to its new radio and voice path by sending a hand-off command to cellular telephone 601 which instructs cellular telephone 601 to change to the operating channel frequency of new voice channel transceiver 609. New voice channel transceiver 609 in this scenario has already been set up to connect the call to some voice treatment such as a recording or operator connection via new voice path to other treatment 610 and new voice path from other treatment 611.

Call interruption module 316 accomplishes sending a hand-off command to cellular telephone 601 by the program 317 operating in microprocessor 318 instructing digitally controlled analog switch 329 (via control and data bus 320) to switch to the state where modulator signal interface line 328 is connected to the output of buffer circuit 338. The program 317 operating in microprocessor 318 then instructs the Manchester data jamming signal generator 337 (via signal generator control bus 336) to Manchester encode an analog message signal to be sent through buffer circuit 338, digitally controlled analog switch 329 and modulator signal interface line 328 to the input of modulator 313. This Manchester encoded analog message is comprised of a standard cellular hand-off data message to cellular telephone 601 wherein the new channel frequency assigned is the frequency on which new voice channel transceiver 609 is operating. The Manchester encoded analog message upon arriving at the input of modulator 313 is modulated onto the RF signal which is then processed by transmit RF circuits 314 and propagated out cell sector transmit antenna 315 to reach cellular telephone 601. Once the Manchester encoded analog message has been generated, program 317, operating in microprocessor 318, instructs digitally controlled analog switch 329 (via control and data bus 320) to switch back to the state where modulator signal interface line 328 is no longer connected to the output of buffer circuit 338.

Now referring again to FIG. 6, when cellular telephone 601 receives the hand-off command message sent by call interruption module 316, cellular telephone 601 sends a 50 ms burst of ST on the reverse voice channel (of original voice channel signal path 602) confirming the receipt of the hand-off command, then immediately re-tunes to the channel frequency on which new voice channel transceiver 609 is operating.

Once cellular telephone 601 arrives on the new channel frequency, cellular telephone 601 communicates through new voice channel signal path 607, new voice channel antenna 608, new voice channel transceiver 609, new voice path to other treatment 610, and new voice path from other treatment 611. This new communications path establishes a voice link between the user of cellular telephone 601 and whatever voice treatment is connected to new voice path to other treatment 610, and new voice path from other treatment 611.

Note that new voice channel signal path 607, new voice channel antenna 608, new voice channel transceiver 609, new voice path to other treatment 610, and new voice path from other treatment 611 are not required to reside in cell site 612. It is only required that voice channel signal path 607 be operable between new voice channel antenna 608 and cellular telephone 601.

In an alternative embodiment a cellular telephone 601 would re-tune to a channel frequency which has no voice channel transceiver operating on it, leaving the call by cellular telephone 601 connected to "dead air".

A simplified flow chart of the program 317 operating in microprocessor 318 of call interruption module 316 is shown in FIG. 7a, FIG. 7b, FIG. 7c and FIG. 7d.

Figure 7A:
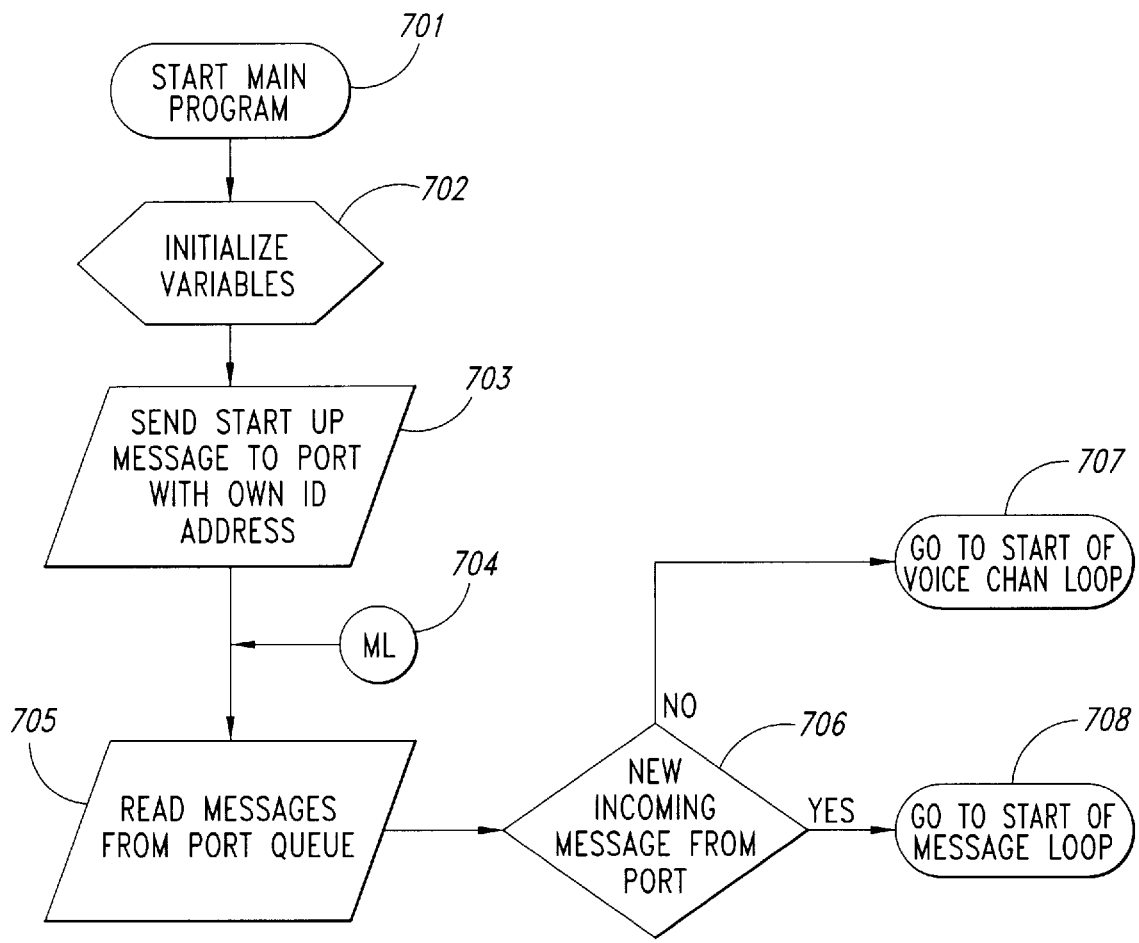
FIG. 7a is a simplified flow chart of the main loop of the process performed by the microprocessor of the voice channel interface circuits according to the preferred embodiment of the present invention.

The main program, shown in FIG. 7a, starts at main program entry point 701. From main program entry point 701 the program progresses to variables initialization block 702. In variables initialization block 702, the program initializes its variables to their default values. The variable "MOBONCHAN" is set to an initial value of zero to indicate that no mobile is known to be operating on voice channel transceiver 301 (shown in FIG. 3). This variable is used in both the voice channel loop of the program (shown in FIG. 7b) and the interruption loop of the program (shown in FIG. 7d). Once this is completed, the program flows from initialization block 702 to input/output block 703. In input/output block 703 the program sends a message out data communications circuit 319 (shown in FIG. 3) which includes the module address ID, informing any external entities (such as call mapping system 121 shown in FIG. 1) that this module is now functional. Once this is completed, the program flows from input/output block 703 to input/output block 705. Note that program flow point 704 feeds into the top of the main program loop (ML) at this entry to input/output block 705.

In input/output block 705 the program reads in any messages waiting in the input port message queue. These messages (if they exist) have arrived via data communications circuit 319 (shown in FIG. 3) from an external entity. The arriving messages may contain requests for status updates or commands to take certain actions or complete specified call interruption tasks (or groups of tasks). Once this input port queue check is completed, the program flows from input/output block 705 to decision block 706.

In decision block 706 it is determined whether a new incoming message was read from the input port queue. If so, the program branches to the start of the message loop (shown in FIG. 7c) via program flow point 708. Otherwise, the program branches to the start of the voice channel loop (shown in FIG. 7b) via program flow point 707.

Figure 7B:
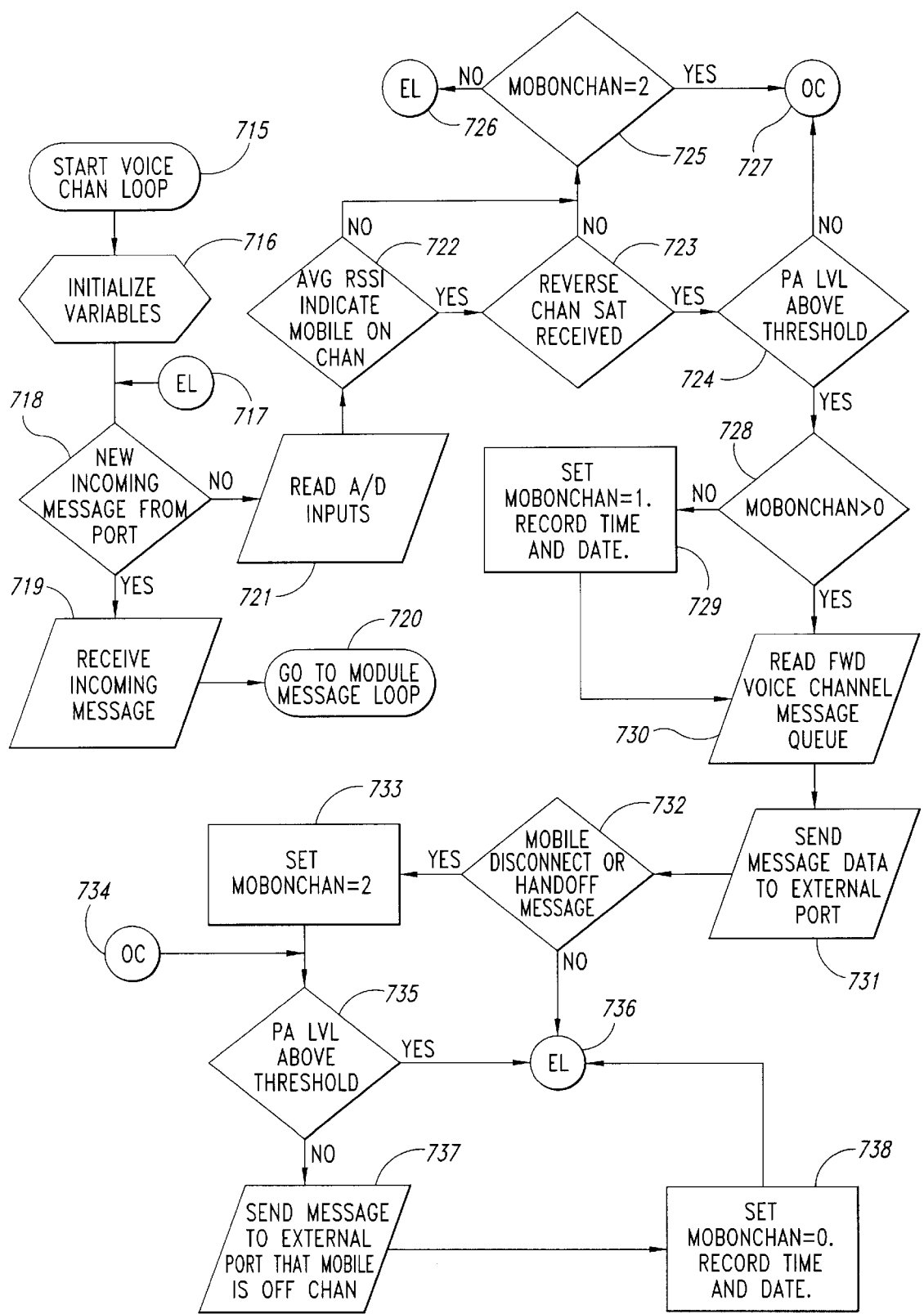
FIG. 7b is a simplified flow chart of the voice channel loop of the process performed by the microprocessor of the voice channel interface circuits according to the preferred embodiment of the present invention.

Now referring to FIG. 7b, the voice channel loop, it can be seen that upon entering this loop via voice channel loop entry point 715, the program progresses to variables initialization block 716 where internal loop variables are initialized to their default values. Once this is completed, the program flows to decision block 718. Note that program flow point 717 also feeds into the voice channel loop at this input to decision block 718. In decision block 718 it is determined whether there is a new incoming message waiting in the port queue. If so, the program flows to input/output block 719 where the message is received and then passed to the start of the message loop (shown in FIG. 7c) via program flow point 720.

If it is determined in decision block 718 that there is no incoming message waiting in the port queue, the program branches from decision block 718 to input/output block 721. In input/output block 721 the program reads the inputs being provided by analog to digital converter 322 (shown in FIG. 3) via control and data bus 320 (also shown in FIG. 3). These inputs provide data regarding the various activities and conditions relating to the voice channel transceiver 301 to which call interruption module 316 is interfaced (as seen in FIG. 3). Of the inputs read in input/output block 721, the PA level, Forward channel SAT, RSSI, Forward channel data messages, and Reverse channel signals inputs are of consequence in the voice channel loop of the program.

After reading these inputs in input/output block 721, the program flows to decision block 722 where it is determined whether the average RSSI indicates that a mobile is operating on voice channel transceiver 301 (shown in FIG. 3). If not, the program branches to decision block 725. If in decision block 722 it is determined that the average RSSI indicates that a mobile is operating on voice channel transceiver 301 (shown in FIG. 3), the program branches to decision block 723 where it is determined whether SAT being received on the reverse channel indicates that a mobile is operating on voice channel transceiver 301 (shown in FIG. 3). If not, the program branches to decision block 725. If in decision block 723 the SAT being received on the reverse channel indicates that a mobile is operating on voice channel transceiver 301 (shown in FIG. 3), the program branches to decision block 724 where it is determined whether the PA level indicates that a mobile is operating on voice channel transceiver 301 (shown in FIG. 3). If not, the program branches to program flow point 727 where it enters the voice channel loop further on at program flow point 734. If in decision block 724 the PA level indicates that a mobile is operating on voice channel transceiver 301 (shown in FIG. 3), the program branches to decision block 728.

Note that the checks performed by decision blocks 722 and 723 are used to determine whether a mobile is operating on voice channel transceiver 301 (shown in FIG. 3). If not (either of the two conditions are not met), the program branches to decision block 725. Decision block 725 determines whether the variable MOBONCHAN has a value of two.

Note that variable MOBONCHAN can have one of three values. The initial value variable MOBONCHAN was originally set in variables initialization block 702. If variable MOBONCHAN has a value of zero, it indicates that no mobile is known to be operating on voice channel transceiver 301 (shown in FIG. 3). If variable MOBONCHAN has a value of one, it indicates that a mobile is known to be operating on voice channel transceiver 301 (shown in FIG. 3). If variable MOBONCHAN has a value of two, it indicates that a mobile is known to be operating on voice channel transceiver 301 (shown in FIG. 3) and that this mobile has either received a hand-off command from voice channel transceiver 301 (shown in FIG. 3) or has issued a mobile disconnect request (1.8 seconds of ST) to voice channel transceiver 301 (shown in FIG. 3).

If in decision block 725 it is determined that the variable MOBONCHAN does not have a value of two, the program branches to program flow point 726 where it re-enters the top of the voice channel loop at program flow point 717. If, however, variable MOBONCHAN does have a value of two (as determined in decision block 725), the program branches to program flow point 727 where it enters the voice channel loop further on at program flow point 734.

If in decision block 724 it is determined that the PA level indicates that a mobile is operating on voice channel transceiver 301 (shown in FIG. 3), The program branches to decision block 728. In decision block 728 it is determined whether variable MOBONCHAN has a value which is greater than value zero (indicating that a mobile is known to be operating on voice channel transceiver 301 (shown in FIG. 3). If not (indicating that a mobile is not known to be operating on voice channel transceiver 301 (shown in FIG. 3), the program branches to process block 729 where the value of variable MOBONCHAN is set to value one (now indicating that a mobile is known to be operating on voice channel transceiver 301). Process block 729 also records the date and time of this event. Once these tasks are completed, the program flows to input/output block 730. If in decision block 728 it is determined that variable MOBONCHAN has a value which is greater than value zero (indicating that a mobile is already known to be operating on voice channel transceiver 301 (shown in FIG. 3), the program branches to input/output block 730.

In input/output block 730 the program reads the Forward voice channel message queue. Any messages sent by voice channel transceiver 301 (shown in FIG. 3) to the mobile unit will have been decoded and queued in input/output block 721 where the A/D inputs were read in. From input/output block 730 the program flows to input/output block 731 where any Forward channel messages received from the queue are sent to external entities via data communications circuit 319 (shown in FIG. 3).

From input/output block 731 the program flows to decision block 732 where it is determined whether a hand-off message was sent to the mobile on the Forward channel, or if a disconnect request signal was received from the mobile on the Reverse channel. If neither of these cases are true, the program branches to program flow point 736, thereby re-entering the top of the voice channel loop at program flow point 717. If in decision block 732 one or both of the conditions checked are true, the program branches to process block 733. In process block 733 the program sets the value of variable MOBONCHAN to value two (indicating that the mobile is known to be on channel, but is expected to leave the channel shortly).

From process block 733 the program flows to decision block 735. Remember that program flow point 734 also feeds into decision block 735 as the re-entry point for the software as it leaves decision blocks 724 and 725 via program flow point 727. Decision block 735 is where the final determination is made as to whether a mobile has stopped operating on voice channel transceiver 301 (shown in FIG. 3). If in decision block 735 it is determined that the PA level indicates that a mobile is still operating on voice channel transceiver 301 (shown in FIG. 3), the software branches to program flow point 736 where it re-enters the top of the voice channel loop at program flow point 717. If in decision block 735 it is determined that the PA level indicates that no mobile is operating on voice channel transceiver 301 (shown in FIG. 3), the software branches to input/output block 737 where a message indicating that the mobile is now off the voice channel is sent to external entities via data communications circuit 319 (shown in FIG. 3).

After sending this message, the program flows to process block 738 where it sets the value of variable MOBONCHAN to value zero (indicating that no mobile is known to be on channel) before re-entering the top of the voice channel loop at program flow point 717 via program flow point 736.

Note that once the program has entered the voice channel loop, the only exit from the loop is via program flow point 720. So it can be seen that only if a message is received from an external entity will the program exit the voice channel loop and enter the message loop.

Whenever it has been determined that a new incoming message was read from the input port queue via data communications circuit 319 (shown in FIG. 3) from an external entity, the program enters the message loop 720 (shown in FIG. 7c) via message loop entry point 739.

Figure 7C:
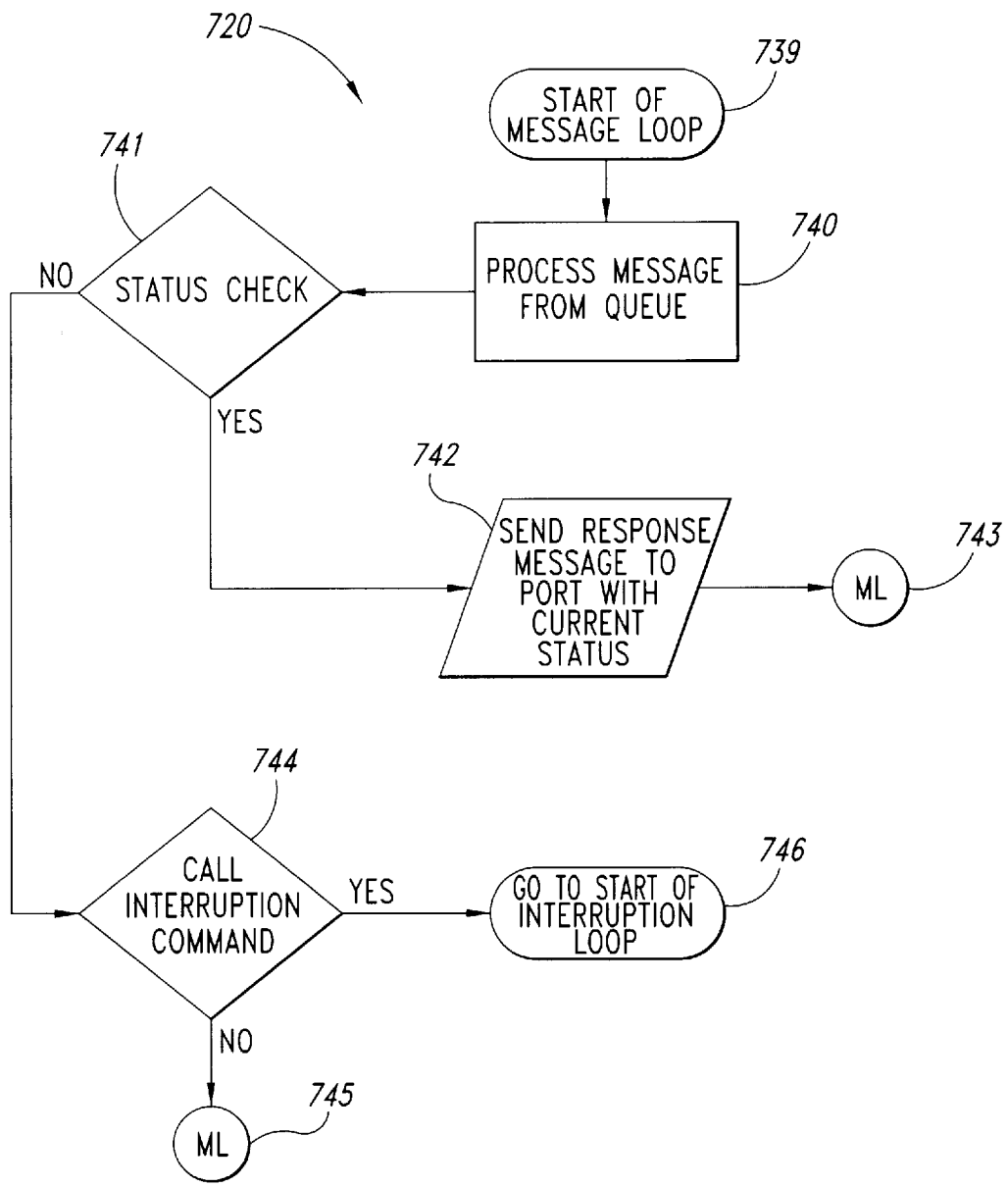
FIG. 7c is a simplified flow chart of the message loop of the process performed by the microprocessor of the voice channel interface circuits according to the preferred embodiment of the present invention.

Now referring to FIG. 7c, it is seen that the program progresses from message loop entry point 739 to process block 740 where the software decodes and processes the incoming message (arriving via data communications circuit 319 from an external entity such as call mapping system 121). When the message has been processed, the program enters decision block 741 where it is determined whether the message is a request for a status check. If so, the software branches to input/output block 742 where a response message (containing the current status of all activities monitored and performed by call interruption module 316) is sent to the external entity making the request. The program then returns to the top of the main program loop (shown in FIG. 7a) via program flow point 743.

If in decision block 741 it is determined that the incoming message is not a request for a status check, the program branches to decision block 744 where it is determined whether the message is a call interruption command. If not, the software branches to program flow point 745 where the program returns to the top of the main program loop (shown in FIG. 7a) via program flow point 745. If in decision block 745 it is determined that the incoming message is a call interruption command, the program branches to the start of the interruption loop (shown in FIG. 7d) via program flow point 746.

Figure 7D:
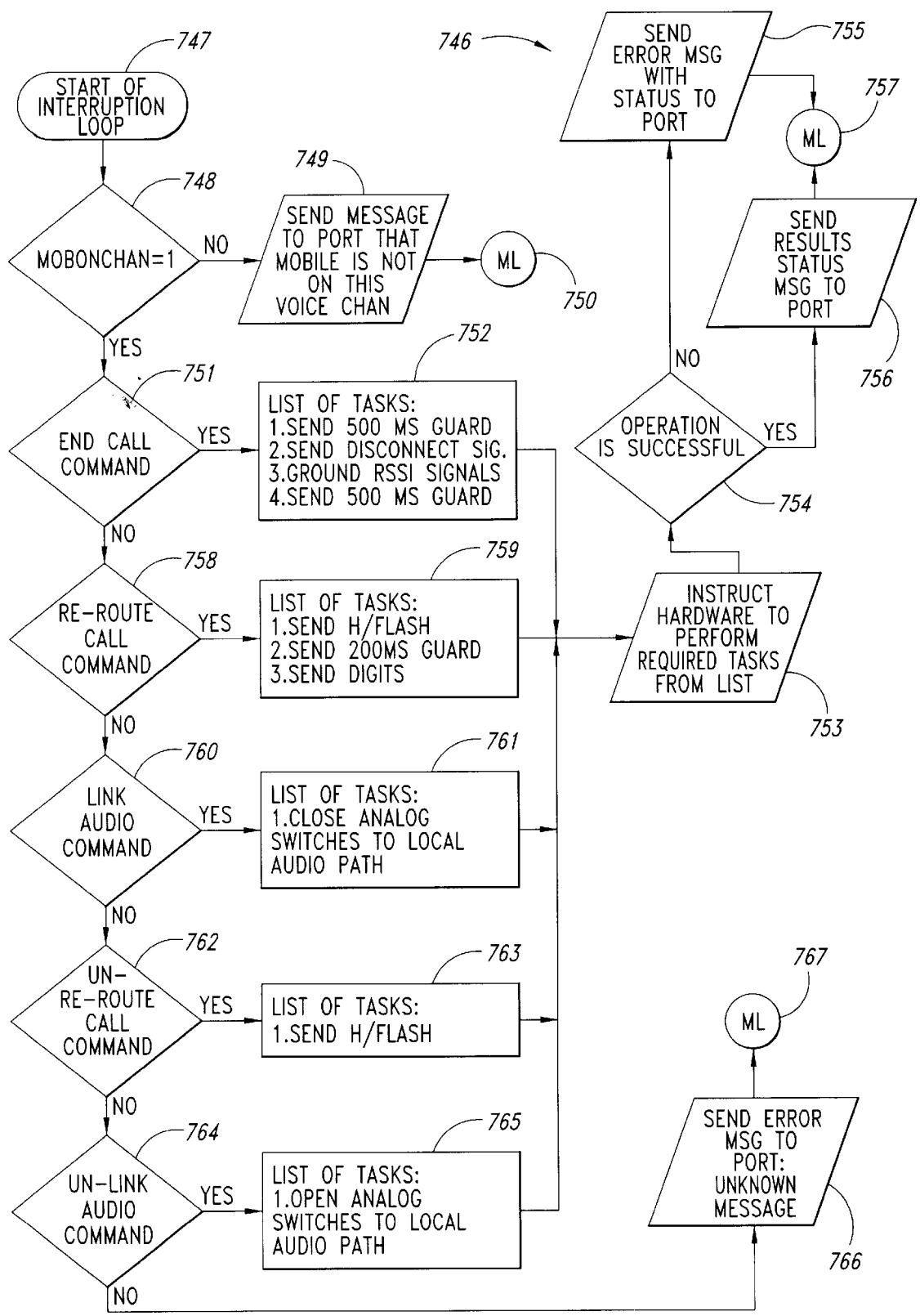
FIG. 7d is a simplified flow chart of the interruption loop of the process performed by the microprocessor of the voice channel interface circuits according to the preferred embodiment of the present invention.

Now referring to FIG. 7d, whenever the program determines that a call interruption message has been received, the program enters the interruption loop via interruption loop entry point 747, flowing directly to decision block 748 where it is determined whether variable MOBONCHAN has the value of one (indicating that a mobile is known to be operating on voice channel transceiver 301 (shown in FIG. 3). If not, the program branches to input/output block 749 where a message is sent (via data communications circuit 319) to an external entity indicating that no mobile is currently operating on this voice channel. From input/output block 749 the program flows to program flow point 750 where it re-enters the top of the main program loop (ML) at program flow point 704 (shown in FIG. 7a).

If in decision block 748 it is determined that variable MOBONCHAN has the value of one (indicating that a mobile is known to be operating on voice channel transceiver 301 (shown in FIG. 3), the program branches to decision block 751.

Note here that there are five call interruption command messages possible in the preferred embodiment of this invention. These are the "END CALL" command, the "RE-ROUTE CALL" command, the "LINK AUDIO" command, the "UN-ROUTE CALL" command, and the "UN-LINK AUDIO" command. For each of these commands a separate combination of individual tasks are performed. How these individual tasks are performed by call interruption module 316 has been described in detail earlier in this specification (in the description of FIG. 3).

It will be useful to refer to both FIG. 7d and FIG. 3 during the following description of the operation of the program in the interruption loop. Note that reference numerals beginning with "3" are found in FIG. 3, and that reference numerals beginning with "7" are found in FIG. 7d.

In decision block 751 it is determined whether the message received was the END CALL command. If so, the program branches to process block 752 where a list of tasks is specified for accomplishing the requirements of this command. In this case the list consists of first injecting (sending) GUARD for 500 ms into the demodulator signal interface line 325, then injecting ST for 1.8 seconds (disconnect signal) into the demodulator signal interface line 325, followed by grounding the RSSI signal interface line 323 while injecting another 500 ms of GUARD into the demodulator signal interface line 325. This process imitates the events of the mobile requesting a disconnect from the call in progress. This causes the cellular switch to immediately end the call. Once this list of tasks has been assembled, the program flows to input/output block 753 where the program instructs the hardware to perform these tasks in the order and timing specified. If in decision block 751 it is determined that the message received was the not the END CALL command, the program branches to decision block 758.

In decision block 758 it is determined whether the message received was the RE-ROUTE CALL command. If so, the program branches to process block 759 where a list of tasks is specified for accomplishing the requirements of this command. In this case the list consists of first injecting (sending) ST for 50 ms (HOOKFLASH signal) into the demodulator signal interface line 325, then injecting GUARD for 200 ms into the demodulator signal interface line 325 , followed by injecting dialed digits data in the form of Manchester encoded analog signals into the demodulator signal interface line 325. Note that these dialed digits are where the call will be routed once they are sent. This process accomplishes "call conferencing" this mobile with the destination "dialed" by the Manchester encoded analog signal.

The initial HOOKFLASH signal causes the cellular switch to send a data message to the mobile on the Forward channel requesting dialed digits from the mobile. In order to mask any response by the mobile unit to the Forward channel message, a 200 ms GUARD is applied, then the desired dialed digits are injected. The originally connected land party is put on hold by the cellular switch during this conference, but remains connected, unable to hear the new conversation. Once this list of tasks has been assembled, the program flows to input/output block 753 where the program instructs the hardware to perform these tasks in the order and timing specified. If in decision block 758 it is determined that the message received was the not the RE-ROUTE CALL command, the program branches to decision block 760.

In decision block 760 it is determined whether the message received was the LINK AUDIO command. If so, the program branches to process block 761 where a list of tasks is specified for accomplishing the requirements of this command. In this case the list consists of establishing the connection between receive audio interface line 339 and local voice circuit equipment via digitally controlled analog switch 342 and establishing the connection between transmit audio interface line 341 and local voice circuit equipment via digitally controlled analog switch 340. Once this list of tasks has been assembled, the program flows to input/output block 753 where the program instructs the hardware to perform these tasks in the order and timing specified. If in decision block 760 it is determined that the message received was the not the LINK AUDIO command, the program branches to decision block 762.

In decision block 762 it is determined whether the message received was the UN-ROUTE CALL command. If so, the program branches to process block 763 where a list of tasks is specified for accomplishing the requirements of this command. In this case the list consists of injecting (sending) injecting ST for 50 ms (HOOKFLASH signal) into the demodulator signal interface line 325. In the case where a conference call is in progress with only the second party connected to the mobile, this has the effect of re-connecting the mobile party to the originally connected land party. Once this list of tasks has been assembled, the program flows to input/output block 753 where the program instructs the hardware to perform these tasks in the order and timing specified. If in decision block 762 it is determined that the message received was the not the UN-ROUTE CALL command, the program branches to decision block 764.

In decision block 764 it is determined whether the message received was the UN-LINK AUDIO command. If so, the program branches to process block 765 where a list of tasks is specified for accomplishing the requirements of this command. In this case the list consists of removing the connection between receive audio interface line 339 and local voice circuit equipment via digitally controlled analog switch 342 and removing the connection between transmit audio interface line 341 and local voice circuit equipment via digitally controlled analog switch 340. Once this list of tasks has been assembled, the program flows to input/output block 753 where the program instructs the hardware to perform these tasks in the order and timing specified. If in decision block 764 it is determined that the message received was the not the UN-LINK AUDIO command, the program branches to input/output block 766 where an error message is sent to the external entity (via data communications circuit 319) indicating that an unknown message type was received. From input/output block 766 the software flows to program flow point 767 where it re-enters the top of the main program loop (ML) at program flow point 704 (shown in FIG. 7*a*).

Once the program has (in input/output block 753) instructed the hardware of call interruption module 316 to perform the tasks listed, the program flows to decision block 754 where a test of the conditions of the call is checked to verify whether the specified operation was successful. If so, the program branches to input/output block 756 where a message is sent to the external entity (via data communications circuit 319) indicating the success of the operation and the new status of the call. Once this message is sent, the software flows through program flow point 757 where it re-enters the top of the main program loop (ML) at program flow point 704 (shown in FIG. 7*a*).

If in decision block 754 it is determined that the specified operation was unsuccessful, the program branches to input/output block 755 where a message is sent to the external entity (via data communications circuit 319) indicating the failure of the operation and the new status of the call. Once this message is sent, the software flows through program flow point 757 where it re-enters the top of the main program loop (ML) at program flow point 704 (shown in FIG. 7*a*).

Thus, using the hardware shown in FIGS. 1–6 and the program depicted in FIGS. 7*a*–7*d*, the present invention provides the ability to disrupt normal completion of a call made through a wireless telephone system in a quick and efficient manner.

Except as otherwise disclosed herein, the various components shown in outline or block form are individually well-known and their internal construction and their operation is not critical either to the making or the using of this invention or to a description of the best mode of the invention.

While the detailed description above has been expressed in terms of specific examples, those skilled in the art will appreciate that many other configurations could be used to accomplish the purpose of the disclosed inventive apparatus. Accordingly, it will be appreciated that various modifications of the above-described embodiments may be made without departing from the spirit or scope of the invention. Therefore, the invention is to be limited only by the following claims.

We claim:

1. A wireless telephone call interruption system responsive to a trigger signal, comprising:
    a wireless telephone;
    an individual land based radio transceiver including circuits structured to transmit signals to the wireless telephone and to receive signals from the wireless telephone during a call; and
    a call interruption module having circuitry structured to transmit one or more interruption signals to one or both of the wireless telephone and the radio transceiver during the call to interrupt the call, the call interruption module transmitting the interruption signals in response to the trigger signal.

2. The wireless telephone call interruption system of claim 1, further comprising:
    a system circuit structured to generate the trigger signal and transmit the trigger signal to the call interruption module based on an interrupt request received from a requesting entity; and
    wherein the one or more interruption signals transmitted by the call interruption module comprise signals having a plurality of audio frequencies.

3. The wireless telephone call interruption system of claim 1 wherein the radio transceiver comprises an individual site voice channel.

4. A cellular telephone call interruption module comprising:

a timing source having an externally triggered output;

a 10 Kilohertz signal generating circuit structured to generate an output of a call termination signal for a period of 1.8 seconds upon receipt of the output from said timing source;

an individual land based radio transceiver comprising an individual cell site voice channel including supervisory tone detection circuits having an input in communication with an output of said signal generating circuit, wherein the supervisory tone detection circuits regard the call termination signal of said signal generating circuit for the period of 1.8 seconds as a mobile request to end a call in progress on said individual land based radio transceiver; and a signal short circuit to ground controlled by said timing source, said signal short circuit to ground, when activated under control of said timing source, electrically shorting to the ground all demodulated signals which appear at said input of said supervisory tone detection circuits of said cell site voice channel, making said demodulated signals undecodable to said supervisory tone detection circuits, said signal short circuit to ground being activated for a period of time before an activation of said signal generating circuit, then deactivated for 1.8 seconds during activation of said signal generating circuit, then reactivated for a period of time.

5. The cellular telephone call interruption module of claim 4, said cellular telephone call interruption module further comprising:

an electronic jamming signal source providing signal output electrically interfaced to an input of a modulator circuit of said cell site voice channel; said electronic jamming signal source, which, when activated under control of said timing circuit, introduces a jamming signal which distorts digital signals sent to said modulator circuit of said cell site voice channel, making said digital signals undecodable to a mobile cellular telephone, thereby preventing said mobile cellular telephone from being handed off to another cell sector during a call interruption process.

6. The cellular telephone call interruption module of claim 5 where said cellular telephone call interruption module further comprises:

a microprocessor operating with a program which causes said microprocessor to act as said timer source and control a detection circuit; said detection circuit constantly communicating status of said cell site voice channel to said microprocessor, providing said microprocessor the ability to detect whether said cell site voice channel is in operation serving any cellular mobile and communicating with an external entity, said external entity providing said external trigger, which upon receipt by said microprocessor initiates said call interruption process.

7. The cellular telephone call interruption module of claim 6 where said microprocessor receives command messages from said external entity, said external trigger being comprised of said command messages specifying initiation of said call interruption process, said microprocessor starting said call interruption process upon receipt of said command messages.

8. The cellular telephone call interruption module of claim 7 where said cellular telephone call interruption module further comprises:

a data decoder electrically interfaced to said input of said modulator circuit, said data decoder communicating with said microprocessor; said data decoder monitoring and decoding cell site originated data arriving at said input of said modulator circuit, sending said cell site originated data to said microprocessor; said microprocessor sending a hand-off notification message to said external entity when a hand-off command is decoded; when said microprocessor detects that said cell site voice channel is in operation serving any cellular mobile, said microprocessor sends a channel in use status message to said external entity; when said microprocessor detects that said cell site voice channel is not in operation serving any cellular mobile, said microprocessor deactivates said 10 kilohertz signal generating circuit and said electronic jamming signal source and said signal short circuit to ground, said software also sending a channel empty status message to said external entity.

9. A cellular telephone system comprising:

a plurality of cellular mobile units each assigned a mobile identification number;

a plurality of discrete assigned cell site voice channels in communication with at least one of said plurality of cellular mobile units;

a plurality of cellular telephone call interruption modules, each of said plurality of cellular telephone call interruption modules being electrically interfaced to its own one of said plurality of discrete assigned cell site voice channels and terminating a call in progress to one of said plurality of cellular mobile units conducted by the one of said plurality of discrete assigned cell site voice channels upon receipt of a trigger signal; and a call activity mapping system in communication with each of said plurality of cellular telephone call interruption modules, said call activity mapping system maintaining a representation of current call activity status for each of said plurality of discrete assigned cell site voice channels that includes the mobile identification number of one of said plurality of cellular mobile units currently operating on each of said plurality of discrete assigned cell site voice channels, said call activity mapping system sending the trigger signal to one of said plurality of cellular telephone call interruption modules upon receiving a specific interruption request from a requesting entity in communication with said call activity mapping system.

10. The cellular telephone call interruption system of claim 9 where said specific interruption request includes said mobile identification number of a targeted cellular mobile; said call mapping system, upon receipt of said specific interruption request, determining if said targeted mobile is currently in operation on one of said discrete assigned cell site voice channels, and, if so, identifying said discrete assigned cell site voice channel as a targeted cell site voice channel, said call mapping system then communicating said command messages to said cellular telephone call interruption module which is electrically interfaced to said targeted cell site voice channel, thereby initiating said call interruption process on said targeted cell site voice channel.

11. The cellular telephone call interruption system of claim 10 where said software operating on said cellular telephone call interruption module which is electrically interfaced to said targeted cell site voice channel also sends a call interruption completed status message to said external entity whenever said call interruption process has resulted in said detection circuit detecting that said cell site voice channel is no longer in operation serving any cellular mobile.

12. The cellular telephone call interruption system of claim 9 where said specific interruption request includes an identity of one specific said discrete assigned cell site voice channel; said call mapping system, upon receipt of said specific interruption request, determining if said discrete assigned cell site voice channel is currently in operation serving any cellular mobile, and, if so, identifying said discrete assigned cell site voice channel as a targeted cell site voice channel, said call mapping system then communicating said command messages to said cellular telephone call interruption module which is electrically interfaced to said targeted cell site voice channel, thereby initiating said call interruption process on said targeted cell site voice channel.

13. The cellular telephone call interruption system of claim 12 where said microprocessor operating on said cellular telephone call interruption module which is electrically interfaced to said targeted cell site voice channel also sends a call interruption completed status message to said external entity whenever said call interruption process has resulted in said detection circuit detecting that said cell site voice channel is no longer in operation serving any cellular mobile.

14. The cellular telephone call interruption system of claim 11 where said cellular telephone call interruption system further comprises:

a plurality of cellular control channel data monitors, each of said cellular control channel data monitors receiving and decoding control channel data destined to be transmitted from a discrete assigned cell site control channel; each of said cellular control channel data monitors communicating with said call activity mapping system, transmitting to said call activity mapping system said control channel data as decoded; said control channel data including mobile voice channel assignments; said call activity mapping system updating said representation of current call activity status from said control channel data received from each of said cellular control channel data monitors; said call activity mapping system also updating said representation of current call activity status with information derived from data communications with each of said cellular telephone call interruption modules; said data communications including said call interruption completed status messages, said channel in use status messages, said channel empty status messages, and said hand-off notification messages.

15. The cellular telephone call interruption system of claim 14 where each said cellular control channel data monitor comprises:

a cellular forward control channel radio frequency receiver, a cellular reverse control channel radio frequency receiver, a control channel data decoding circuit in communication with said channel mapping system and said cellular reverse control channel radio frequency receiver and said cellular forward control channel radio frequency receiver; said control channel data decoding circuit receiving and decoding cell site originated control channel data from demodulated audio signals output from said cellular forward control channel radio frequency receiver; said control channel data decoding circuit also receiving and decoding mobile transmitted control channel data from demodulated audio signals output from said cellular reverse control channel radio frequency receiver; each said cellular control channel data monitor receiving cellular control channel radio signals from transmitters operating in a specific said cell site sector.

16. The cellular telephone call interruption system of claim 14 where each said cellular control channel data monitor comprises:

a cellular forward control channel data decoder in communication with said channel mapping system; a cellular reverse control channel data decoder in communication with said channel mapping system; said cellular forward control channel data decoder being electrically interfaced to an input to the modulator circuit of an existing cell site forward control channel radio frequency transmitter, receiving and decoding cell site originated control channel data from analog signals arriving at said input to the modulator circuit of said existing cell site forward control channel radio frequency transmitter; said cellular reverse control channel data decoder being electrically interfaced to an input to the supervisory tone detection circuits of an existing cell site reverse control channel radio frequency receiver, receiving and decoding mobile originated control channel data from demodulated analog signals arriving at said input to the supervisory tone detection circuits of said existing cell site reverse control channel radio frequency receiver; each said cellular control channel data monitor receiving cellular control channel data from a specific said cell site sector.

17. The cellular telephone call interruption system of claim 14 where each of said cellular telephone call interruption modules has a unique module identifier; said hand-off notification message includes said unique module identifier and a hand-off channel frequency number; said call activity mapping system, after sending said command message to said cellular telephone call interruption module electrically interfaced to said targeted cell site voice channel, upon receipt of said hand-off notification message from said cellular telephone call interruption module electrically interfaced to said targeted cell site voice channel, updating said representation of current call activity status to indicate newly assigned voice channel for said targeted cellular mobile; said call activity mapping system then sending said command messages to said cellular telephone call interruption module electrically interfaced to said newly assigned voice channel, specifying initiation of said call interruption process on said newly assigned voice channel.

18. The cellular telephone call interruption system of claim 17 where said hand-off notification message also includes a signaling audio tone code associated with said hand-off channel frequency number; said representation of current call activity status also includes, for each said discrete assigned cell site voice channel, said signaling audio tone code associated with said discrete assigned cell site voice channel; said representation of current call activity status also includes, for each said discrete assigned cell site voice channel, said unique module identifier of said cellular telephone call interruption module which is electrically interfaced to said discrete assigned cell site voice channel; said call activity mapping system addressing each of said command messages with said unique module identifier of said cellular telephone call interruption module for which said command message is intended.

19. The cellular telephone call interruption system of claim 18 where said channel in use status message includes said unique module identifier; said call activity mapping system learns said unique module identifier of each said cellular telephone call interruption module within a cell site sector and which said discrete assigned cell site voice channel said unique module identifier is associated with, by tracking which said unique module identifier is sent in each said channel in use status message after said mapping system receives a said mobile voice channel assignment from said control channel data from said cell site sector.

20. A method of disrupting normal completion of a call in a wireless telephone system comprising the steps of:

transmitting signals to a wireless telephone from an individual land based radio transceiver and receiving signals from the wireless telephone at the radio transceiver during a call;

providing a trigger signal to a call interruption module to initiate an interruption of the call; and transmitting one or more interruption signals to one or both of the wireless telephone and the radio transceiver from the call interruption module during the call to interrupt the call in response to the trigger signal.

21. The method of claim 20 wherein the act of transmitting interruption signals comprises transmitting interruption signals to one or both of the wireless telephone and the radio transceiver from the call interruption module during the call, in response to the trigger signal, which causes one of the wireless telephone and the radio transceiver to interrupt the call without an authorization from the wireless telephone or the radio transceiver.

22. The method of claim 21 wherein the act of transmitting the one or more interruption signals comprises transmitting an interruption signal indicative of an interruption condition between the wireless telephone and the radio transceiver.

23. The method of claim 20 wherein the act of transmitting the one or more interruption signals comprises transmitting a call termination signal to the radio transceiver.

24. The method of claim 20 wherein the act of transmitting the one or more interruption signals comprises transmitting an incorrect signal audio tone to the wireless telephone.

25. The method of claim 20 wherein the act of transmitting the one or more interruption signals comprises transmitting an incorrect signal audio tone to the radio transceiver.

26. The method of claim 20 wherein the act of transmitting the one or more interruption signals comprises transmitting a message to the wireless telephone instructing the wireless telephone to end the call.

27. The method of claim 20 wherein the act of transmitting the one or more interruption signals comprises transmitting a message to the wireless telephone instructing the wireless telephone to hand off to a voice channel which is not in operation within a radio range of the wireless telephone and transmitting an interfering signal to the radio transceiver.

28. The method of claim 20 wherein the act of transmitting the one or more interruption signals comprises:

transmitting a signal requesting a conference call to the radio transceiver;

transmitting a distorted signal to the wireless telephone; and sending a data message to the radio transceiver to mimic a data signal from the wireless telephone and to initiate a conference call procedure in the radio transceiver.

29. The method of claim 20 wherein the act of transmitting the one or more interruption signals comprises:

dialing a call to the wireless telephone;

sending a conference call request signal to the radio transceiver; and transmitting a signal to the radio transceiver to terminate the call.

30. The method of claim 20 wherein the act of transmitting the one or more interruption signals comprises:

receiving data signals from a wireless telephone during a call attempt;

modifying the data signals; and transmitting the modified data signals to the radio transceiver such that the radio transceiver establishes a call between the wireless telephone and a selected destination.

31. The method of claim 20 wherein the act of transmitting the one or more interruption signals comprises:

coupling selected circuits in the radio transceiver to a ground voltage reference to mute an audio path between the wireless telephone and the radio transceiver;

transmitting an interfering signal on a voice path between the wireless telephone and the radio transceiver; and introducing interfering radio frequency signals on a radio channel frequency supporting the call between the wireless telephone and the radio transceiver.

32. The wireless telephone call interruption system of claim 1 wherein the call interruption module is structured to transmit the one or more interruption signals during the call which cause one of the wireless telephone and the radio transceiver to interrupt the call, the call interruption module transmitting the interruption signals without an authorization from the wireless telephone or the radio transceiver.

33. The wireless telephone call interruption system of claim 32 wherein the call interruption module is structured to transmit the one or more interruption signals which are indicative of an interruption condition existing between the wireless telephone and the radio transceiver.

* * * * *